(12) United States Patent
Raghavan et al.

(10) Patent No.: US 11,206,074 B2
(45) Date of Patent: Dec. 21, 2021

(54) DETERMINING SUB-DOMINANT CLUSTERS IN A MILLIMETER WAVE CHANNEL

(71) Applicant: QUALCOMM Incorporated, San Diego, CA (US)

(72) Inventors: Vasanthan Raghavan, West Windsor Township, NJ (US); Jung Ho Ryu, Fort Lee, NJ (US); Kobi Ravid, Closter, NJ (US); Juergen Cezanne, Ocean Township, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/679,793

(22) Filed: Nov. 11, 2019

(65) Prior Publication Data

US 2020/0186228 A1    Jun. 11, 2020

Related U.S. Application Data

(60) Provisional application No. 62/776,330, filed on Dec. 6, 2018.

(51) Int. Cl.
*H04W 4/00* (2018.01)
*H04B 7/06* (2006.01)
(Continued)

(52) U.S. Cl.
CPC ......... *H04B 7/0695* (2013.01); *H04B 7/0456* (2013.01); *H04B 7/0617* (2013.01); *H04W 16/28* (2013.01); *H04W 24/10* (2013.01)

(58) Field of Classification Search
CPC .... H04B 7/0695; H04B 7/0617; H04B 7/088; H04B 7/0456; H04W 24/10; H04W 16/28; H04W 16/26; H04W 24/08
See application file for complete search history.

(56) References Cited

U.S. PATENT DOCUMENTS 10,594,383 B1 *    3/2020   Orhan ............... H04B 7/0456
2018/0254809 A1 *  9/2018   Huang ............... H04B 7/024
(Continued)

FOREIGN PATENT DOCUMENTS

WO    WO-2018173239 A1    9/2018

OTHER PUBLICATIONS

International Search Report and Written Opinion—PCT/US2019/060998—ISAEPO—dated Jul. 17, 2020.

*Primary Examiner* — Khalid W Shaheed
(74) *Attorney, Agent, or Firm* — Holland & Hart LLP

(57) ABSTRACT

Methods, systems, and devices for wireless communications are described. A first wireless device may receive a first beam measurement report from a second wireless device, the first beam measurement report indicating a first set of beam measurements for a wireless channel between the first wireless device and the second wireless device. The first wireless device may transmit to the second wireless device a cluster validity metric for at least one beam in the first beam measurement report. The first wireless device may receive from the second wireless device, in response to transmitting the cluster validity metric, a second beam measurement report indicating a second set of beam measurements for the wireless channel. The first wireless device may select a beam for transmitting to the second wireless device based at least in part on the first and second beam measurement reports.

30 Claims, 13 Drawing Sheets

(51) Int. Cl.
  *H04W 24/10* (2009.01)
  *H04W 16/28* (2009.01)
  *H04B 7/0456* (2017.01)

(56) References Cited

U.S. PATENT DOCUMENTS

| | | | | |
|---|---|---|---|---|
| 2018/0302141 | A1* | 10/2018 | Kutz | H04B 7/043 |
| 2018/0324713 | A1* | 11/2018 | Yoo | H04W 52/40 |
| 2019/0053013 | A1* | 2/2019 | Markhovsky | G01S 5/06 |
| 2019/0268962 | A1 | 8/2019 | Wang et al. | |
| 2019/0334611 | A1* | 10/2019 | Zhang | H04B 17/382 |
| 2020/0067615 | A1* | 2/2020 | Ghanbarinejad | H04B 17/309 |
| 2020/0099437 | A1* | 3/2020 | Harada | H04W 76/19 |
| 2020/0322814 | A1* | 10/2020 | Tofighbakhsh | H04W 24/02 |

* cited by examiner

| AoD Elevation | AoD Azimuth | AoA Elevation | AoA Azimuth | Gain |
|---|---|---|---|---|
| 94.3° | 99.4° | 101.1° | 107.7° | 0.90 |
| 100.2° | 112.8° | 104.1° | 111.4° | 0.76 |
| 83.0° | 41.0° | 71.3° | 108.1° | 0.61 |
| 88.2° | 52.5° | 79.4° | 95.5° | 0.60 |
| 74.2° | 64.3° | 78.7° | 81.8° | 0.44 |

| AoD Elevation | AoD Azimuth | AoA Elevation | AoA Azimuth |
|---|---|---|---|
| 92.7° | 97.8° | 98.3° | 107.3° |
| 92.7° | 97.8° | 103.8° | 107.3° |
| 98.3° | 97.8° | 98.3° | 107.3° |
| 98.3° | 97.8° | 103.8° | 107.3° |

FIG. 2B

DETERMINING SUB-DOMINANT CLUSTERS IN A MILLIMETER WAVE CHANNEL

CROSS REFERENCE

The present Application for Patent claims the benefit of U.S. Provisional Patent Application No. 62/776,330 by RAGHAVAN et al., entitled "DETERMINING SUB-DOMINANT CLUSTERS IN A MILLIMETER WAVE CHANNEL," filed Dec. 6, 2018, assigned to the assignee hereof, and expressly incorporated herein.

BACKGROUND

The following relates generally to wireless communications, and more specifically to determining sub-dominant clusters in a millimeter wave (mmW) channel.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communication systems may operate in mmW frequency ranges, e.g., 26 GHz, 28 GHz, 39 GHz, 57-71 GHz, etc. Wireless communications at these frequencies may be associated with increased signal attenuation (e.g., path loss, penetration loss, blockage loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path, penetration and blockage losses in mmW communication systems, transmissions from the base station and/or the UE may be beamformed. Moreover, a receiving device may use beamforming techniques to configure antenna(s) and/or antenna array(s) such that transmissions are received in a directional manner. mmW networks may perform a variety of beam management/beam refinement procedures in order to monitor beam performance and identify potential candidate beams available for use if the current active beam suddenly becomes unavailable and/or deteriorates in signal quality below an acceptable threshold level. In some aspects, such beam management techniques may include a transmitting device transmitting multiple beamformed signals in a sectoral or sweeping manner around its coverage area. The receiving device may monitor for the beamformed signals and measure signal strengths using one or more receive beams. Conventionally, the transmitting device (e.g., a base station) may configure the receiving device to return channel measurements for a particular number of its beamformed signals. The receiving device identifies the particular number of transmit beams and corresponding receive beams having the strongest signal level and returns those to the transmitting device in a beam measurement report.

SUMMARY

The described techniques relate to improved methods, systems, devices, and apparatuses that support determining sub-dominant clusters in a millimeter wave (mmW) channel. Generally, the described techniques provide various mechanisms that improve identification/delineation of sub-dominant clusters within the mmW channel. Aspects of the described techniques may be implemented by the transmitting device (e.g., base station and/or user equipment (UE)) and/or by a receiving device (e.g., a UE and/or another base station). Broadly, aspects of the described techniques provide for a cluster validity metric to be used by the transmitting device to request additional beam measurements from the receiving device to aid in cluster identification. For example, the transmitting device (a first wireless device in this context) may receive a beam measurement report from a receiving device (the second wireless device in this context) that carries or conveys an indication of a first set of beam measurements for the wireless channel between the transmitting device and the receiving device. The transmitting device may, based on the beam measurement report, identify or otherwise determine a cluster validity metric for the receiving device to use for subsequent beam measurements. For example, the transmitting device may identify one or more clusters based on the first beam measurement report and determine that, at least to some degree, that a spatial separation between two or more beams reported in the first beam measurement report do not satisfy a threshold. As another example, the cluster validity metric may be based on a beam reported in the beam measurement report having a wide beam width, and therefore being unable to distinguish between two or more clusters located within the coverage area of the beam with the wide beam width.

Accordingly, the transmitting device may transmit or otherwise provide an indication of the cluster validity metric to the receiving device, which may use the cluster validity metric when performing additional beam measurements and reporting. For example, the receiving device may discard beams that fall within the minimum spatial separation threshold and, instead, only report beams in a subsequent beam measurement report that satisfy or fall outside of the spatial separation threshold. As another example, the receiving device may perform beam measurements on more narrower beams in order to distinguish between distinct clusters that are located proximate to each other. Accordingly, the receiving device may transmit the subsequent beam measurement report to the transmitting device, which may use this information to select a beam for transmitting to the receiving device. For example, the transmitting device may develop a more refined understanding of dominant and/or sub-dominant clusters within the propagation path of the wireless channel and use this information to select the best transmit beam to use for communicating with the receiving device.

BRIEF DESCRIPTION OF THE DRAWINGS

FIG. 2B illustrates an example of beam pair identification that supports determining sub-dominant clusters in a mmW channel in accordance with aspects of the present disclosure.

DETAILED DESCRIPTION

Figure 1:
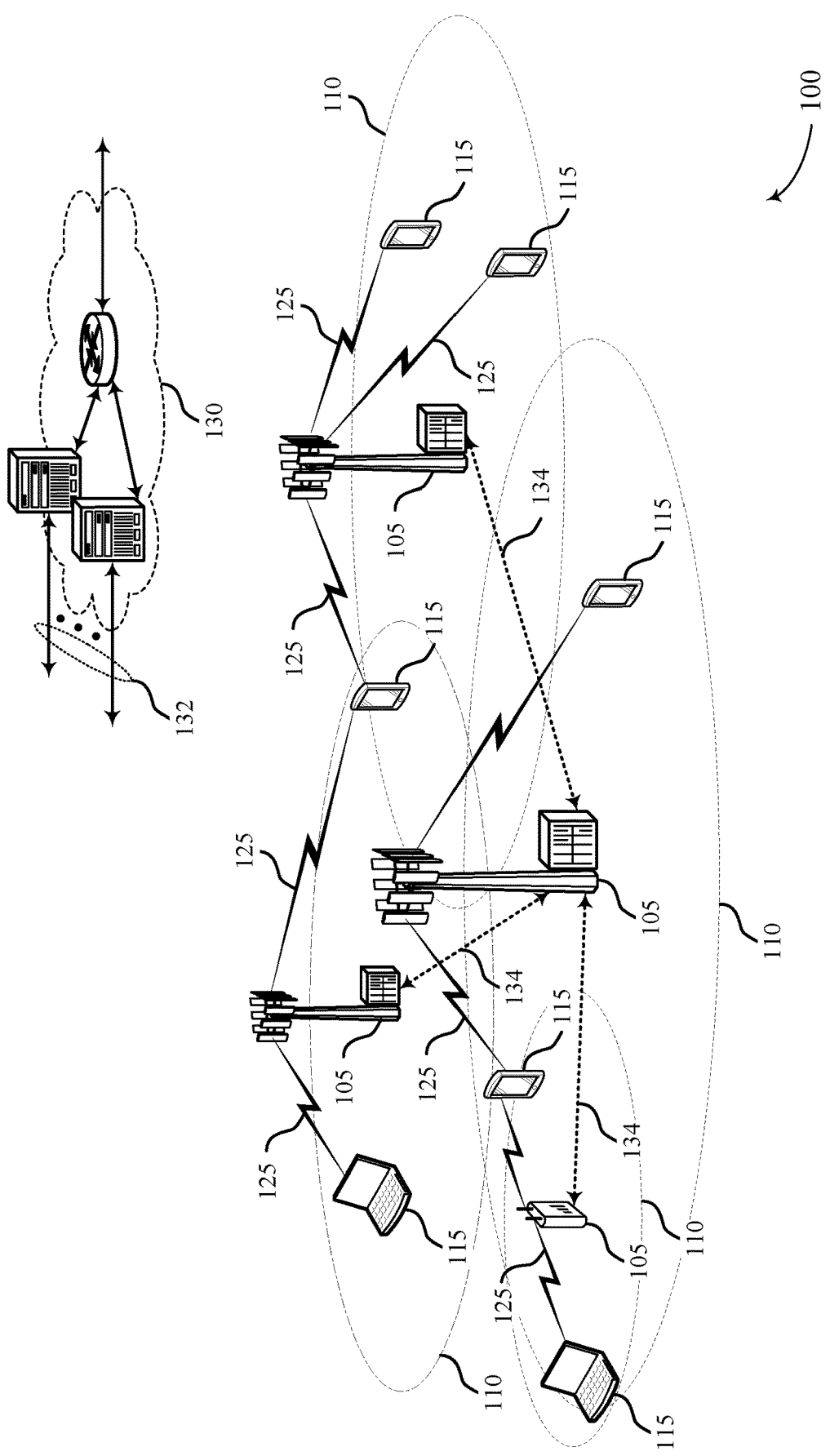
FIG. 1 illustrates an example of a system for wireless communications that supports determining sub-dominant clusters in a millimeter wave (mmW) channel in accordance with aspects of the present disclosure.

Some wireless communication systems may operate in millimeter wave (mmW) frequency ranges (e.g., 28 GHz, 40 GHz, 60 GHz, etc.). In some cases, wireless communication at these frequencies may be associated with increased signal attenuation (e.g., path loss), which may be influenced by various factors, such as temperature, barometric pressure, diffraction, etc. As a result, signal processing techniques such as beamforming (i.e., directional transmission) may be used to coherently combine signal energy and overcome the path loss in specific beam directions. In some cases, a device may select an active beam for communicating with a network by selecting the strongest beam from among a number of candidate beams. mmW wireless networks typically rely on beam management procedures to monitor the performance of active beams and identify candidate beams that can be utilized in the event the active beam becomes unavailable or otherwise unusable. Conventionally, the transmitting device (e.g., a base station and/or a user equipment (UE)) will configure a receiving device (e.g., a UE and/or base station) with a defined number of best beams to be reported in a beam measurement report. The transmitting device transmits beamformed signals in a sweeping manner around its coverage area and the receiving device measures the receive signal levels using one or more receive beams for each transmit beam. The receiving device transmits a beam measurement report to the transmitting device that identifies the defined number of best beams via beam indices, along with their corresponding measured received signal levels (e.g., gain or reference signal received power (RSRP) levels). The transmitting device uses this information when selecting the active beam for continued communications with the receiving device. The transmitting device can also use these beams as fall back options in the case of blockage, or for creating multi-beams in two distinct directions for enhanced spectral efficiencies.

Another function may be performed in a mmW network may include cluster identification. Broadly, a cluster may refer to a property of the wireless channel between the transmitting device and the receiving device. The "cluster" is a standard term in channel modeling for distinct objects or surfaces (e.g., glass windows/panes, building corners, foliage, lamp posts, etc.) within a channel environment that allow propagation from the transmitting device to the receiving device. For example, the cluster within the wireless channel may impact the propagation path/characteristics of the beamformed signal in some manner, at least to some degree. For example, glass windows or other flat, reflective surfaces may reflect a beamformed transmission in the direction of the receiving device, which may create a cluster for the wireless channel. Cluster identification is an important function in determining the channel propagation characteristics in a mmW network.

However, such conventional techniques do not allow for adequate identification of dominant and sub-dominant clusters located within the wireless channel. For example, there is no mechanism using such conventional techniques for the spatial separation between the beams being reported in the beam measurement report to account for sub-dominant clusters that are spatially distinct from each other and/or dominant cluster(s). Moreover, such conventional techniques do not provide a mechanism for the beam width to be adjusted in order to distinguish between clusters that are located proximate to each other, and therefore cannot be distinguished when using a wide beam width for the beam measurements.

Aspects of the disclosure are initially described in the context of a wireless communication system. Generally, the described techniques provide mechanisms that improve wireless communications in a mmW network. In some aspects, the described techniques provide a mechanism where cluster identification within the wireless channel is improved in order to improve beam selection for ongoing beamformed transmissions. In some aspects, this may include a transmitting device (e.g., the first wireless device in this context) receiving a beam measurement report from a receiving device (e.g., a second wireless device in this context) that indicates beam measurements for a wireless channel between the transmitting device and the receiving device. The transmitting device may use the information carried in the beam measurement report to identify one or more clusters in the wireless channel, e.g., to determine or create a cluster validity metric. In some aspects, this may include the transmitting device identifying the one or more clusters based on the spatial separation between two or more beams reported in the beam measurement report and/or based on the beam width of the beams being reported in the beam measurement report. Accordingly, the transmitting device may identify a cluster validity metric for transmission to the receiving device that carries or conveys an indication of additional parameters for the receiving device to use for subsequent beam measurements. The receiving device may use the cluster validity metric when performing additional beam measurements on the channel, e.g., may select beams for reporting in a subsequent beam measurement report satisfying a spatial separation threshold and/or select more narrower beams for the subsequent beam measurement report to provide a clearer picture of clusters located proximate to each other. Accordingly, the receiving device may transmit the subsequent beam measurement report to the transmitting device, which may use this information when selecting a beam for transmitting to the receiving device.

Particular aspects of the subject matter described herein may be implemented to realize one or more advantages. The described techniques may support improvements in communications using multiple component carriers for communication at a UE, which may improve reliability and throughput, as well as mitigating the effects of time delays between communications over different component carriers, among other advantages. As such, supported techniques may include improved network operations and, in some examples, may promote network efficiencies, among other benefits.

Aspects of the disclosure are further illustrated by and described with reference to apparatus diagrams, system diagrams, and flowcharts that relate to determining sub-dominant clusters in a mmW channel.

FIG. 1 illustrates an example of a wireless communications system 100 that supports determining sub-dominant clusters in a mmW channel in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the received signal with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and, in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a transmitting device (e.g., a first wireless device, which may be an example of a UE 115 and/or a base station 105) may, receiving a first beam measurement report from a second wireless device, the first beam measurement report indicating a first set of beam measurements for a wireless channel between the first wireless device and the second wireless device. The transmitting device may transmit to the second wireless device a cluster validity metric for at least one beam in the first beam measurement report. The transmitting device may receive from the second wireless device, in response to transmitting the cluster validity metric, a second beam measurement report indicating a second set of beam measurements for the wireless channel. The transmitting device may select a beam for transmitting to the second wireless device based at least in part on the first and second beam measurement reports.

In some aspects, a receiving device (e.g., a second wireless device, which may be an example of a UE 115 and/or a base station 105) may transmit a first beam measurement report to a first wireless device, the first beam measurement report indicating a first set of beam measurements for a wireless channel between the first wireless device and the second wireless device. The receiving device may receive from the first wireless device a cluster validity metric for at least one beam in the first beam measurement report. The receiving device may transmit to the first wireless device a second beam measurement report based at least in part on the cluster validity metric, the second beam measurement report indicating a second set of beam measurements for the wireless channel. The cluster validity metric may indicate whether one or more beams in a beam report correspond to distinct clusters or sub-dominant clusters. For example, a single bit may indicate that a beam corresponds to a cluster that is not distinct from a cluster corresponding to another beam. The cluster validity metric may indicate whether one or more beams in a beam report are sufficiently spatially distinct at the first wireless device. For example, the cluster validity metric may include one or more bits indicating whether a specific beam in the beam measurement report is spatially distinct from a second beam in the beam measurement report. As another example, the cluster validity metric may indicate the index of another beam from which a specific beam is not distinct. This information can allow the receiving device to perform beam measurements and/or send a second beam measurement report that does not include a beam that was indicated as not distinct by the cluster validity metric.

Figure 2A:
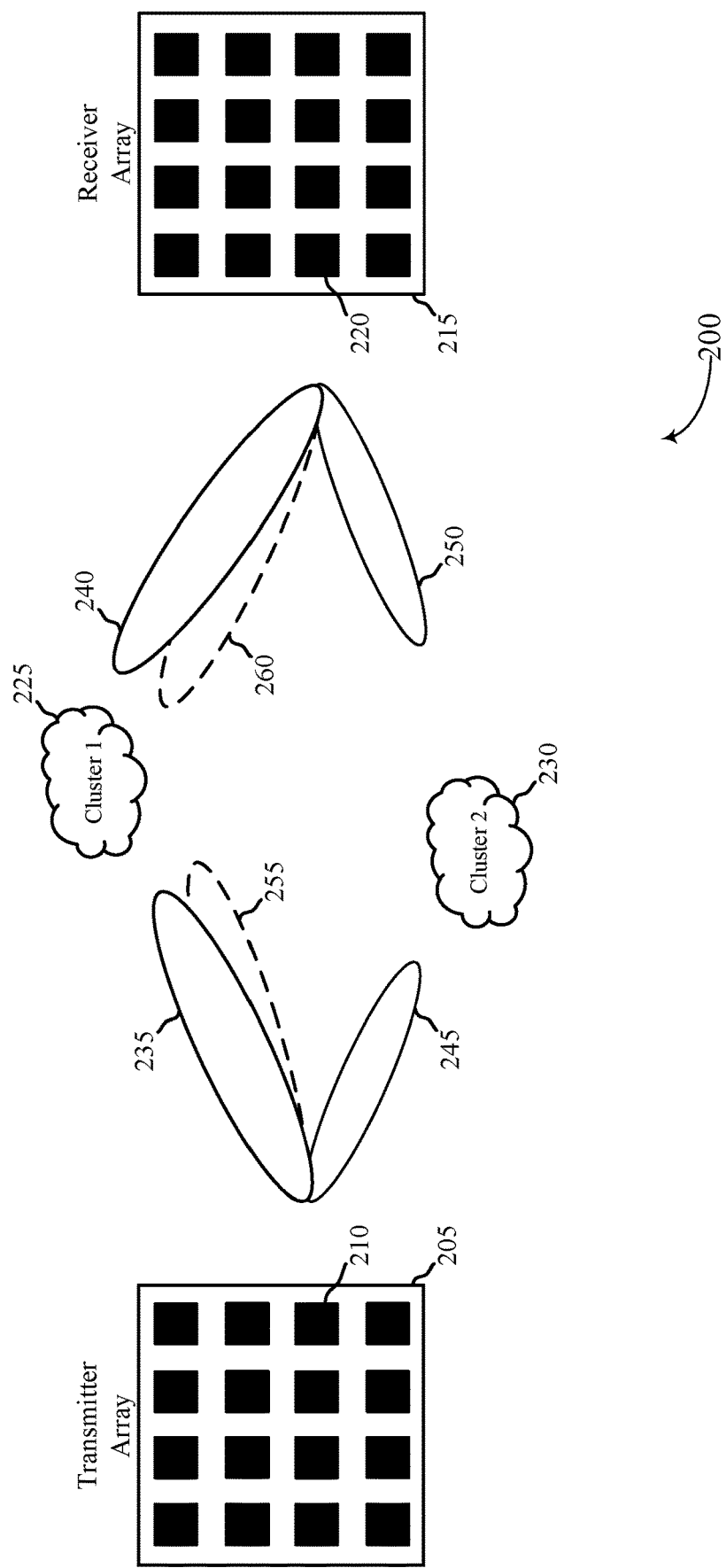
FIG. 2A illustrates an example of a wireless communication system that supports determining sub-dominant clusters in a mmW channel in accordance with aspects of the present disclosure.

FIG. 2A illustrates an example of a wireless communication system 200 that supports determining sub-dominant clusters in a mmW channel in accordance with aspects of the present disclosure. FIG. 2B illustrates an example of beam pair identification 290 that supports determining sub-dominant clusters in a mmW channel in accordance with aspects of the present disclosure. In some examples, wireless communication system 200 may implement aspects of wireless communications system 100. Aspects of wireless communication system 200 may be implemented by a transmitting device having a transmitter array 205 and a receiving device having a receiver array 215, which may be examples of a base station and/or a UE, as described herein. Generally, the transmitting device may refer to a first wireless device and the receiving device may refer to a second wireless device. For example, the transmitter array 205 may correspond to first device that includes a base station or a UE and the receiver array 2015 may correspond to a second device that includes a base station or a UE.

Generally, the transmitting device (e.g., the first wireless device) and the receiving device (e.g., the second wireless device) may be configured to perform wireless communications in a mmW network. For example, the transmitting device may have a transmitter array 205 that includes a plurality of antenna elements 210 that are used by the transmitting device to configure a beamformed signal for wireless transmission to the receiving device. Similarly, the receiving device may have a receiver array 215 that includes a plurality of antenna elements 220 that are used by the receiving device to receive a signal from the transmitting device in a directional manner. The transmitter array 205 may also be used for beamformed reception and the receiver array 215 may be used for transmitting beamformed signals. For example, the transmitting device and the receiving device may utilize digital and/or analog techniques to control one or more of the antenna elements 210 and 220, respectively, in order to perform wireless communications using beamformed signals. Generally, the transmitting device and/or receiving device may utilize such beamforming techniques in a mmW network for access traffic and/or backhaul traffic, such as an integrated access and backhaul (IAB) network.

In some aspects, due to the sparsity of channels and the use of larger antenna arrays (e.g., a larger number of antenna elements 210 and/or 220), beamforming in a mmW network is more directional than in sub-6 GHz systems. In some aspects, this may lead to signaling happening over distinct clusters in the wireless channel. Broadly, clusters may have multiple paths over a narrow/wide annular spread. Depending on the environment, there could be small (e.g., 1-2) or a large (e.g., 5-7) number of clusters and the channel.

Generally, beamforming and/or beam management techniques in a mmW network may typically include the identification of distinct clusters. For example, clusters may be distinct/spatially separated and therefore can be used for diversity/beam switching in a single-user system (e.g., to overcome blockage) and/or for well-separated/low-interference multi-user beam designs. As another example, the multi-beams/multiplexing over a single radio frequency (RF) chain may be created by co-phasing beams across distinct clusters and/or beamforming can be performed over multiple RF chains with distinct clusters.

Conventional beamforming and/or beam management techniques typically do a poor job of identifying clusters, such as sub-dominant clusters and/or clusters that are spatially close to each other. For example, conventional techniques may include the UE reporting beam indices and RSRP levels to be used by the base station (e.g., in a beam measurement report). The base station typically accepts the beam measurement report and uses the indicated beam indices and associated RSRP levels as is, e.g., conventional techniques do not provide a mechanism for the base station to refuse or reject the report. Broadly, aspects of the described techniques provide a mechanism by which the base station (e.g., the transmitting device in this context) may reject some or all of the information indicated in the beam measurement report and, instead, asked for additional or better information from the UE (e.g., the receiving device in this context).

In some aspects, conventional beam management techniques may be based on different beam widths. For example, beam management may use P1/P2/P3 beams, with a P1 beam having a wider beam width than a P2 or a P3 beam, e.g., begin with a wide beam width and move to a narrower beam width on base station side with a P2 beam and at the UE side with a P3 beam. In some examples, the P1 beam may be used for transmitting a synchronization signal block (SSB), whereas a P2/P3 beam may be used for transmitting a channel state information reference signal (CSI RS). Generally, beam management includes the transmitting device transmitting and the receiving device scanning using a codebook of a fixed size (e.g., all entries for P1 beams). The receiving device determines the RSRP estimates for all beam pairs to form an RSRP table. In some examples, the receiving device may average RSRP values over multiple sub-bands and/or multiple symbols for signal to noise ratio (SNR) enhancement. Broadly, each entry in the RSRP table may correspond to an RSRP value obtained by the receiving device that corresponds to a particular beam pair. The beam pairing may refer to the transmit beam index from the transmitting device and the receive beam index of the receiving device used to determine the RSRP value. The receiving device creates the RSRP table and identifies the best beams (e.g., the highest RSRP or gain values) to be included in a beam measurement report transmitted to the transmitting device. For each included RSRP value in the measurement report, the receiving device includes the corresponding transmit beam index of the transmitting device, e.g., the transmitting device may be unaware of which receive beam of the receiving device was used to obtain the RSRP value. In some aspects, the transmitting device may configure or otherwise inform the receiving device of how many best beams to report and the beam measurement report, e.g., by signaling or configuring the receiving device to include K best beams in the measurement report.

In a first method for conventional beam/cluster identification, existing P1, P2, P3 beam procedures may be used, e.g., a P1 beam may be used over the SSB, with P2/P3 beams being used for a CSI RS. The procedure may use a beam codebook where all entries are for the P1 beam at the transmitting device and the receiving device. The receiving device may obtain or otherwise determine RSRP estimates for all beam pairs (e.g., possibly averaged over multiple sub-bands and/or multiple symbols) to form the RSRP table.

In some aspects, this first method may be used when low latency is necessary to set up a link, where individual peak performance may be obtained slowly. For example, the transmitting device may configure the receiving device to include K (e.g., K=4) RSRP values from the RSRP table to be used to identify the best K beam pairs/clusters. As one nonlimiting example, this may be based on:

$$(i_1, j_1) = \arg\max_{i \in I_R, j \in I_T} RSRP_{ij}$$

where $i \in I_R$ refers to the receiver beam index set and $j \in I_T$ refers to the transmitter beam index set. The receiving device may continue creating the RSRP table using:

$$(i_2, j_2) = \arg\max_{i \in I_R, j \in I_T, i \neq i_1, j \neq j_1} RSRP_{ij}$$

and so on, up to the value K. The transmitting device and the receiving device may continue to perform beam refinement (e.g., using P2 and P3 beams) on the best beam pairs obtained from the P1 beams.

In a second method for conventional beam/cluster identification, existing P1, P2, P3 beam procedures may be used, e.g., a P1 beam may be used over the SSB, with P2/P3 beams being used for a CSI RS. The procedure may use a beam codebook where all or some entries are for the P1 beam, with other entities for P2 and/or P3 beams at the transmitting device and the receiving device. The receiving device may obtain or otherwise determine RSRP estimates for all beam pairs (e.g., possibly averaged over multiple sub-bands and/or multiple symbols) to form the RSRP table. In some aspects, this second method may be used when latency is not an issue and all of the beams in the codebook can be scanned before setting up a link. For example, the transmitting device may configure the receiving device to include K (e.g., K=4) RSRP values from the RSRP table to be used to identify the best K beam pairs/clusters. As one nonlimiting example, this may again be based on:

$$(i_1, j_1) = \arg\max_{i \in I_R, j \in I_T} RSRP_{ij}$$

where $i \in I_R$ refers to the receiver beam index set and $j \in I_T$ refers to the transmitter beam index set. The receiving device may again continue creating the RSRP table using:

$$(i_2, j_2) = \arg\max_{i \in I_R, j \in I_T, i \neq i_1, j \neq j_1} RSRP_{ij}$$

and so on up to the value K. The transmitting device and the receiving device may continue to perform beam refinement (e.g., using P2 and P3 beams) on the best beam pairs obtained from the P1 beams.

Continuing with the discussion using the first method, different size codebooks may be used. This example may assume that the wireless channel between the transmitting device and the receiving device has five clusters as outlined in the following table:

| AoD Elevation | AoD Azimuth | AoA Elevation | AoA Azimuth | Gain |
|---|---|---|---|---|
| 86.3° | 79.9° | 70.3° | 110.8° | 1.78 |
| 100.4° | 111.6° | 105.0° | 80.8° | 1.38 |
| 65.7° | 54.9° | 82.3° | 96.7° | 0.79 |
| 79.4° | 136.4° | 85.2° | 47.3° | 0.64 |
| 71.7° | 34.1° | 88.0° | 53.4° | 0.35 |

A 4×1 codebook, using conventional techniques, would approximate first and second clusters as:

| AoD Elevation | AoD Azimuth | AoA Elevation | AoA Azimuth |
|---|---|---|---|
| 90.0° | 77.5° | 90.0° | 102.5° |
| 90.0° | 102.5° | 90.0° | 77.5° |

A 4×2 codebook, using conventional techniques, would approximate first and second clusters as:

| AoD Elevation | AoD Azimuth | AoA Elevation | AoA Azimuth |
|---|---|---|---|
| 102.2° | 102.5° | 102.2° | 77.5° |
| 102.2° | 77.5° | 77.8° | 102.5° |

An 8×2 codebook, using conventional techniques, would approximate first and second clusters as:

| AoD Elevation | AoD Azimuth | AoA Elevation | AoA Azimuth |
|---|---|---|---|
| 77.8° | 83.8° | 77.8° | 109.0° |
| 102.2° | 109.0° | 102.2° | 83.8° |

A 16×2 codebook, using conventional techniques, would approximate first and second clusters as:

| AoD Elevation | AoD Azimuth | AoA Elevation | AoA Azimuth |
|---|---|---|---|
| 102.2° | 112.3° | 102.2° | 80.7° |
| 77.8° | 80.7° | 77.8° | 105.7° |

A 32×8 codebook, using conventional techniques, would approximate neighbor beams of a first cluster as:

| AoD Elevation | AoD Azimuth | AoA Elevation | AoA Azimuth |
|---|---|---|---|
| 86.7° | 79.1° | 68.3° | 110.6° |
| 86.7° | 79.1° | 74.7° | 110.6° |

Accordingly, conventional techniques beginning with a 4×1 or an 8×2 codebook allows refinement of the first and second clusters in the channel. Using the 4×2 and 16×2 codebooks flip the order of the first and second clusters, which may possibly be resolved in beam refinement. However, starting with the 32×8 codebook, identifying the second cluster becomes difficult since the reported best two beams are neighbor beams to the first cluster in the channel.

Continuing with the discussion using the second method, different size codebooks may again be used. This example may assume that the wireless channel between the transmitting device and the receiving device has five clusters as outlined in the following table:

| AoD Elevation | AoD Azimuth | AoA Elevation | AoA Azimuth | Gain |
|---|---|---|---|---|
| 86.3° | 92.6° | 80.3° | 131.6° | 2.85 |
| 92.7° | 46.2° | 95.9° | 89.1° | 2.03 |
| 86.8° | 104.4° | 80.9° | 123.4° | 1.14 |
| 65.9° | 92.9° | 74.6° | 132.2° | 0.09 |
| 86.1° | 52.0° | 78.2° | 40.1° | 0.08 |

A 4×1 codebook, using conventional techniques, would approximate a second cluster as:

| AoD Elevation | AoD Azimuth | AoA Elevation | AoA Azimuth |
|---|---|---|---|
| 90.0° | 49.5° | 90.0° | 77.5° |
| 90.0° | 49.5° | 90.0° | 102.5° |

A 4×2 codebook, using conventional techniques, would approximate second or third (or first) clusters as:

| AoD Elevation | AoD Azimuth | AoA Elevation | AoA Azimuth |
|---|---|---|---|
| 102.2° | 49.5° | 102.2° | 77.5° |
| 77.8° | 102.5° | 77.8° | 130.5° |

An 8×2 codebook, using conventional techniques, would approximate a first cluster as:

| AoD Elevation | AoD Azimuth | AoA Elevation | AoA Azimuth |
|---|---|---|---|
| 77.8° | 96.2° | 77.8° | 139.3° |
| 77.8° | 96.2° | 77.8° | 122.8° |

A 16×2 codebook, using conventional techniques, would approximate a first cluster as:

| AoD Elevation | AoD Azimuth | AoA Elevation | AoA Azimuth |
|---|---|---|---|
| 77.8° | 93.1° | 77.8° | 126.5° |
| 77.8° | 93.1° | 77.8° | 134.7° |

A 32×8 codebook, using conventional techniques, would approximate a first cluster as:

| AoD Elevation | AoD Azimuth | AoA Elevation | AoA Azimuth |
|---|---|---|---|
| 86.7° | 91.6° | 74.7° | 132.6° |
| 86.7° | 91.6° | 80.9° | 132.6° |

Accordingly, conventional techniques using method two illustrates that the second dominant cluster may be identified if the codebook is wide enough. If the codebook is narrow, neighbor beams to dominant clusters may be identified. This leads to difficulty in identification of sub-dominant clusters in the channel.

Another illustration of the difficulties with conventional techniques relates to cumulative distribution function (CDF). For example, using a CDF of: $|\theta_{j1}-\theta_{j2}|+|\Phi_{j1}-\Phi_{j2}|$ over multiple channel realizations with L=5 clusters, we can show that conventional techniques generate unwanted results over a large fraction of channel realizations. For example, deviation/error for the first beam pair is typically small (e.g., less than five degrees in most cases) with a narrow codebook. However, the second beam pair is often a neighbor beam, indicating that the codebook is too narrow for use in discovering sub-dominant clusters in the channel. With a wide codebook, the deviation/error for the first beam pair is large (e.g., median of 15 degrees error for a large array is quite huge). However, deviation/error of the second beam pair is comparable to the first beam pair indicating that the codebook provides sufficient granularity to parse the sub-dominant clusters in the channel.

Conventional techniques may further be problematic when using smaller backhaul arrays (e.g., fewer antenna elements 210 and/or 220). As one non-limiting example, we may assume that the transmitting device planar array and receiving device planar array are 16×4, e.g., in a backhaul setting. We may further assume that the AoD and AoA spread (e.g., coverage areas) for both arrays is 120° and 45°. Both the transmitting device and the receiving device may use a codebook size of 256 (e.g., 32 beams in the azimuth and 8 beams in the elevation). We may also assume that the channel between the transmitting device and the receiving device has L=5 clusters, which results in conventional techniques identifying the four beam pair information, as indicated by the table shown in FIG. 2B.

According to conventional techniques, all of the top four beam pairs actually point to the same/best cluster, e.g., they are neighbor beams (as indicated by the arrows) to the best beam pairs actually pointing to the same/best cluster, e.g., row one in the first table. Conventional techniques that use the P1/P2/P3 codebook have too much granularity to ensure that neighbor beams can indicate distinct clusters.

Accordingly, aspects of the described techniques provide a mechanism for improved identification and classification of clusters, such as a first cluster 225 and/or a second cluster 230. Broadly, the described techniques may utilize a cluster validity metric to signal that one or more beams reported in a beam measurement report are unacceptable, and therefore a second beam measurement report is being requested. This may begin by identifying the best cluster in the channel from the RSRP table (e.g., the best beam measurements from a first set of beams indicated in the first beam measurement report) as follows:

$$(i_1, j_1) = \arg\max_{i \in I_R, j \in I_T} RSRP_{ij}$$

where $i \in I_R$ refers to the receiver beam index set and $j \in I_T$ refers to the transmitter beam index set. The transmitting device may continue using the first beam measurement report by considering the second beam pair candidate using:

$$(i_2, j_2) = \arg\max_{i \in I_R, j \in I_T, i \neq i_1, j \neq j_1} RSRP_{ij}$$

In some aspects, each beam in the transmitter/receiver codebook may correspond to a targeted direction. From this information (e.g., from an RSRP table created based on the first beam measurement report), the following metrics may be defined:

$\Delta\theta_R=|\theta_{i1}-\theta_{i2}|, \Delta\theta_T=|\theta_{j1}-\theta_{j2}|$ →Angle Differences in Elevation $\Delta\phi_R=|\phi_{i1}-\phi_{i2}|, \Delta\phi_T=|\phi_{j1}-\phi_{j2}|$ →Angle Differences in Azimuth The following spatial separation classification metrics may also be defined:

$\Delta_{Sum,R}=\Delta\theta_R \Delta\phi_R$ →Sum Angular Separation in Azimuth/Elevation at Receiver $\Delta_{Min,R}=\min(\Delta\theta_R,\Delta\theta_R)$ →Worst-Case Angular Separation at Receiver $\Delta_{Sum,T}=\Delta\theta_T+\Delta\phi_T$ →Sum Angular Separation in Azimuth/Elevation at Transmitter $\Delta_{Min,T}=\min(\Delta\theta_T,\Delta\phi_T)$ →Worst-Case Angular Separation at Transmitter Generally, one or more of these metrics may lead to a cluster validity metric. Next, a second/sub-dominant cluster from the second beam pair candidate may be identified according to the following spatial separation rule: $(i_2,j_2)$ is the second best cluster if:

$\Delta_{Sum,R}>\tau_{Sum,R}$ OR $\Delta_{Min,R}>\tau_{Min,R}$ AND $\Delta_{Sum,T}>\tau_{Sum,T}$ OR $\Delta_{Min,T}>\tau_{Min,T}$ In some aspects, this may be considered a spatial separation threshold that must be satisfied before the beam pair can be considered to point to a second best cluster. For example, these metrics/spatial separation rules may be considered a minimum spatial separation (which may be part of, or based on, the cluster validity metric) rule or threshold used to determine whether beams for a second set of beam measurements are included in the second beam measurement report. In some aspects, the $\tau_{Sum,R}$, $\tau_{Sum,T}$, $\tau_{Min,R}$, and $\tau_{Min,T}$ are appropriately designed based on antenna parameters/geometry, codebook design/configuration at the transmitter and/or receiver, tolerance for a mis-identification of sub-dominant clusters, and the like. Using these techniques for P1/P2/P3 procedures allows for feedback of the best beam indices on the transmitter side as well as RSRP estimates. In such determination, the receiver side may ensure the spatial separation of the first and second best beams at the receiver side (e.g., since the receiver side is typically unaware of beam codebooks being used on the transmitter side, or their directional information/orientation, etc.). To ensure that the second best beam candidate actually corresponds to a sub-dominant cluster in the channel and is spatially distinct at the transmitter side, the transmitter side needs to inform the receiver side of the spatial separation of the beam pair at the transmitter side (e.g., via the cluster validity metric). Accordingly, the transmitter side may transmit or otherwise provide the cluster validity metric to the receiver side, which may use this information when performing a second round of beam measurements and corresponding beam measurement reporting.

For example, the described techniques may include a receiving device (e.g., a second wireless device in this context) performing beam measurements on a first set of beams. In some aspects, the first set of beams may include beams 235, 245, and 255 from the transmitting device perspective and beams 240, 250, and 260 from the receiving device perspective. The receiving device may be configured to transmit a beam measurement report that includes the best two beams (e.g., K=2), in this example. This may include the receiving device generating an RSRP table with the highest gains or RSRP values corresponding to a first beam pair that includes beams 235 and 240, a second beam pair that includes beams 255 and 260, and a third beam pair that includes beams 245 and 250. Within this context, the receiving device may transmit a first beam measurement report to the transmitting device (e.g., a first wireless device in this context) that carries or otherwise conveys an indication of a first set of beam measurements. In this example, this may include the receiving device including in the first beam measurement report an indication of signal strength for the first best beam pair (e.g., an RSRP or gain value for the beam pair corresponding to beams 235 and 240) and the second best beam pair (e.g., an RSRP or gain value for the beam pair corresponding to beams 255 and 260). Although discussed with respect to a beam pair, in some examples, the beam measurement report may simply include a beam index corresponding to the beams measured from the transmitting device along with a corresponding gain or RSRP value for each transmit beam.

The transmitting device may receive the first beam measurement report and utilize aspects of the described techniques to identify or otherwise determine that the first beam pair and the second beam pair are neighbor beams. For example, the transmitting device may determine that the second cluster corresponding to the second beam pair do not satisfy the spatial separation rule. Accordingly, the transmitting device may transmit or otherwise provide an indication of the cluster validity metric for at least one beam indicated in the first beam measurement report. For example, the cluster validity metric may indicate that the first beam pair (e.g., corresponding to beams 235 and 240) satisfy the spatial separation threshold, but that the second beam pair (e.g., corresponding to beams 255 and 260) do not satisfy the spatial separation threshold, are neighbor beams with respect to the first cluster 225.

The receiving device may receive the cluster validity metric and perform a second set of beam measurements according to aspects of the described techniques. For example, the receiving device may utilize the rules/metrics discussed above to determine what beams to report in the second beam measurement report, which must satisfy the spatial separation threshold in order to be included. Accordingly, the receiving device may perform additional beam measurements and transmit or otherwise provide a second beam measurement report to the transmitting device. In some aspects, the second beam measurement report may carry or convey an indication of a second set of beam measurements for the wireless channel. For example, according to the described techniques the receiving device may include the first best beam pair (e.g., corresponding to beams 235 and 240) and the third best beam pair (e.g., corresponding to beams 245 and 250 that are associated with the second cluster 230) in the second beam measurement report. The transmitting device may receive this information and select a beam for transmitting to the receiving device based, at least in some aspects, on the first beam measurement report and/or the second beam measurement report. In some aspects, this may include the transmitting device confirming that the spatial separation between the beams indicated in the second beam measurement report satisfy the spatial separation threshold. In other words, the transmitting device may identify or otherwise determine that there is the first cluster 225 and the second cluster 230 in the wireless channel between the transmitting device and the receiving device. The transmitting device may use this information when selecting a beam 235 as well as a beam 245 to use for communicating with the receiving device based at least in part on the identified first cluster 225 and second cluster 230.

In some aspects, this may include, after the receiving device transmits or otherwise provides an indication of the top-K beam pair indices and associated RSRPs, the transmitting device checking the spatial separation classification metrics and informing the receiving device that the beam candidates indeed correspond to the same clusters and/or for the receiving device to discard some/all of the candidates and look for better beam pair candidates (e.g., based at least in part on the first beam measurement report). The transmitting device may transmit or otherwise provide an indication of the cluster validity metric for the K-1 beam candidates reported by the receiving device. In some examples, the cluster validity metric may be conveyed in a binary fashion (e.g., using a 1 or a 0) to indicate whether or not the reported beams are spatially distinct enough, and hence correspond to a valid cluster identification. If the cluster validity metric for any beam candidate indicates that the beam is not spatially distinct (e.g., fails to satisfy the spatial separation threshold), the receiving device may search for better beam pairs and make a further report to the transmitting device in a second beam measurement report.

In some aspects, the transmitting device may ask for a larger list of beam pair candidates along with spatial separation information at the receiving device. This may include making a determination of the best clusters to be used in subsequent communications and informing the receiving device of the used choices from the receiving device beam measurement report. In some aspects, this may include the transmitting device communicating a partial/full codebook/angular information to the receiving device, and allowing the receiving device to make a full determination/identification of the sub-dominant clusters in the wireless channel on its own. In some aspects, this may include the transmitting device and the receiving device cooperatively agreeing on the threshold used in the spatial separation determination (e.g., cooperative agreement on the $\tau_{Sum,R}$, $\tau_{Sum,T}$, $\tau_{Min,R}$, and $\tau_{Min,T}$) based on the codebook types, antenna geometry, long-term sense of the environment that allows parsing of clusters, and the like.

Accordingly, aspects of the described techniques support the transmitting device (e.g., a base station) using and/or rejecting some or all of the beams carried in the beam measurement report received from a corresponding UE. The base station may reject the reports if insufficient angular separation of the beams (e.g., the spatial separation fails to satisfy the threshold) is determined. Additional reasons for refusing the initial beam measurement report and requesting an additional beam measurement report may also be considered.

Figure 3A:
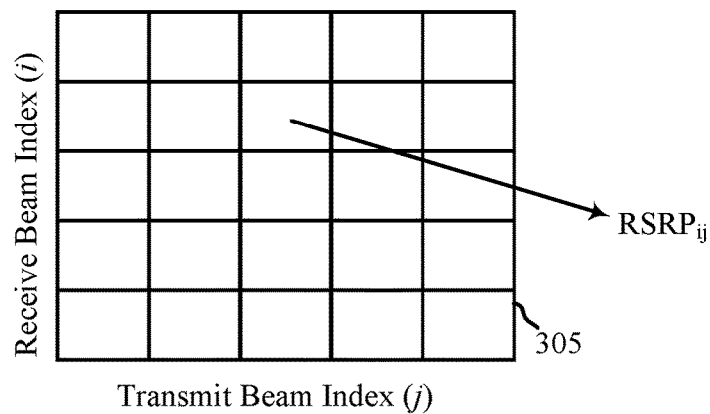
FIGS. 3A and 3B illustrate example of a reference signal received power (RSRP) tables that supports determining sub-dominant clusters in a mmW channel in accordance with aspects of the present disclosure.
Figure 3B:
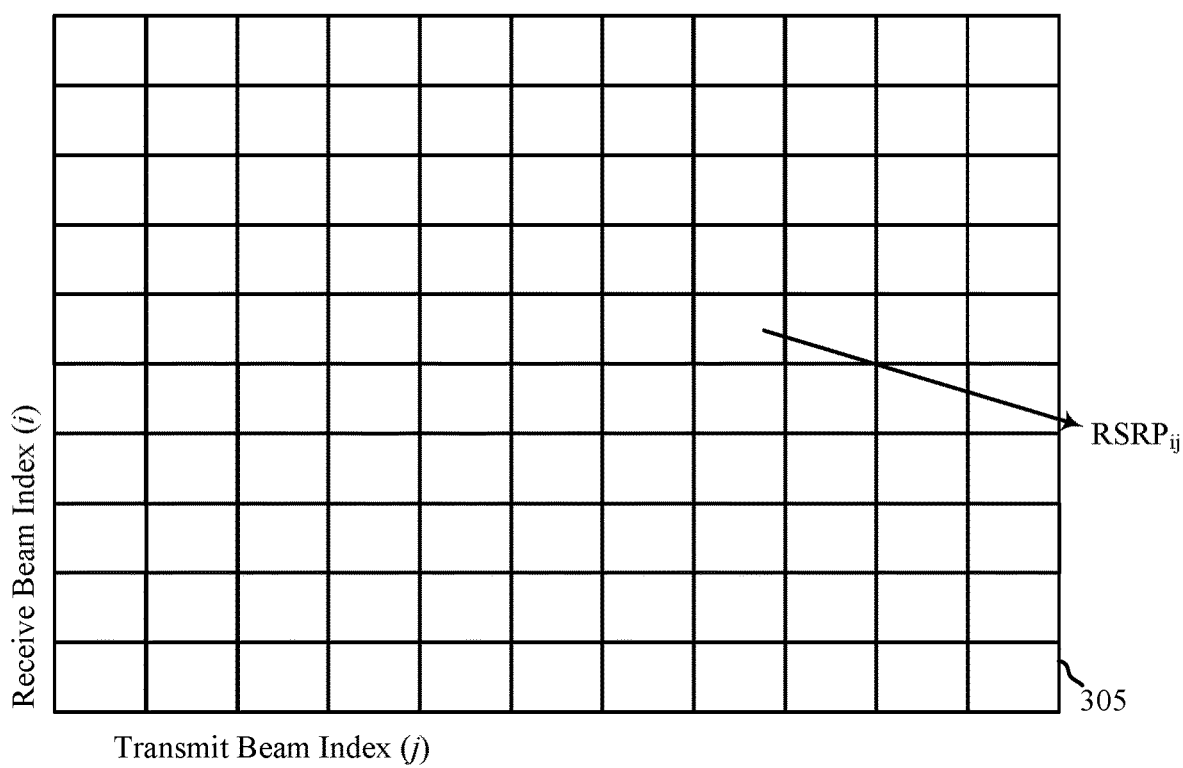

FIG. 3 illustrates an example of a RSRP table 300 that supports determining sub-dominant clusters in a mmW channel in accordance with aspects of the present disclosure. In some examples, RSRP table 300 may implement aspects of wireless communication systems 100 and/or 200. Aspects of RSRP tables 300 may be implemented by a transmitting device (e.g., a first wireless device) and/or a receiving device (e.g., a second wireless device), which may be examples of a base station and/or a UE as is described herein.

Generally, each RSRP tables 300 may be developed by a receiving device and/or transmitting device based on beam measurements performed over a wireless channel between the receiving device and the transmitting device. Broadly, each row may correspond to a receive beam index (i) whereas each column may correspond to a transmit beam index (j). For each receive beam index and transmit beam index, the receiving device may measure or otherwise determine an RSRP value 305 (e.g., a gain value) for the corresponding beam pair. For example, the receiving device may, for each transmit beam index, measure a receive signal level using an available set of receive beams corresponding to the receive beam indices to determine the RSRP value 305. In some aspects, the receiving device may select from the RSRP table 300 the best-K beam pairs to report in the corresponding beam measurement report. In the example illustrated in FIG. 3A, this may include 5 potential receive beams and 5 potential transmit beams, resulting in the corresponding RSRP table 300-a having 25 RSRP values 305. In the example illustrated in FIG. 3B, this may include 10 potential receive beams and 11 potential transmit beams, resulting in the corresponding RSRP table 300-b having 110 RSRP values 305. It is to be understood that different size RSRP tables 300 may be used.

As discussed above, the receiving device may include an indication of the best-K beams in its first beam measurement report to the transmitting device. Generally, the best-K beams may be identified based on the RSRP table 300. In some aspects, the transmitting device may receive the first beam measurement report and respond with the cluster validity metric that carries or conveys an indication of whether or not the reported beam(s) in the first beam measurement report satisfy a spatial separation threshold. For example, the transmitting device may indicate that the first and third, in one example, beams reported in the first measurement report satisfy the spatial separation threshold, but that the second and fourth beams reported in the first beam measurement report fail to satisfy the spatial separation threshold. Accordingly, the receiving device may perform additional beam measurements (and/or reference a previously generated RSRP tables 300) and respond with a second beam measurement report indicating a second set of beam measurements. The second set of beam measurements may include RSRP values 305 selected from an RSRP table 300 that satisfy the spatial separation threshold (e.g., based at least in part on the cluster validity metric). The receiving device may transmit the second beam measurement report to the transmitting device, which may use this information when selecting a beam for transmitting to the receiving device.

In some aspects, RSRP tables 300-a and 300-b illustrate example where the transmitting device receives the first beam measurement report from the receiving device and responds by transmitting the cluster validity metric along with the request for the receiving device to increased beam count for the second measurement report. That is, the requested increase may be used by the receiving device to perform additional beam measurements over the wireless channel which may result in a RSRP table 300 (e.g., such as RSRP table 300-b) having more RSRP values 305 than was used for the first beam measure report (e.g., that was based on RSRP table 300-a).

Accordingly, aspects of the described techniques provide a mechanism where by a first wireless device may communicate a cluster validity metric to a second wireless device upon beam reporting from the second wireless device to the first wireless device. The beam report may include beam indices to be used at the first device and RSRP values 305 of the link established with the beam pairs at both devices. The cluster validity metric may be a function of the spatial separation between the corresponding directions of beams indicated in the beam, reporting an inability to parse the environment which is a function of the antenna geometry/sizes, long-term channel characteristics, codebook types used, and the like. The spatial separation may be a function of azimuth separation and/or elevation separation. The cluster validity metric could be indicated for the one or more of the top-K sub-dominant beam indexes reported by the second wireless device. The cluster validity metric could be a binary corresponding to a "1" value indicating that the reported beam index is a sub-dominant cluster or a "0" value indicating that the reported beam index is not a sub-dominant cluster.

In some aspects, the second wireless device may provide further beam reports of beams and RSRPs if the cluster validity metric corresponding to some of the beams in the prior beam reports indicates a non-valid sub-dominant cluster. In some aspects, the first wireless device may request a longer beam report from the second wireless device and make a determination of sub-dominant clusters from the longer report. The first wireless device may inform the second wireless device of the correct subset of sub-dominant clusters from this report. In some aspects, the first wireless device may communicate partial/full codebook/angular information to the second wireless device to allow it to make the sub-dominant cluster determination prior to beam reporting.

In some aspects, the first wireless device and the second wireless device may agree on thresholds in sub-dominant cluster determination. In some aspects, the thresholds may be a function of codebook types used at either device, antenna geometry, long-term since of the environment, and the like. In some aspects, the first wireless device could be a base station and the second wireless device may be a UE or a customer premise equipment (CPE). In some aspects, the first wireless device and the second wireless device may both be base stations, e.g., in a backhaul setting.

Figure 4:
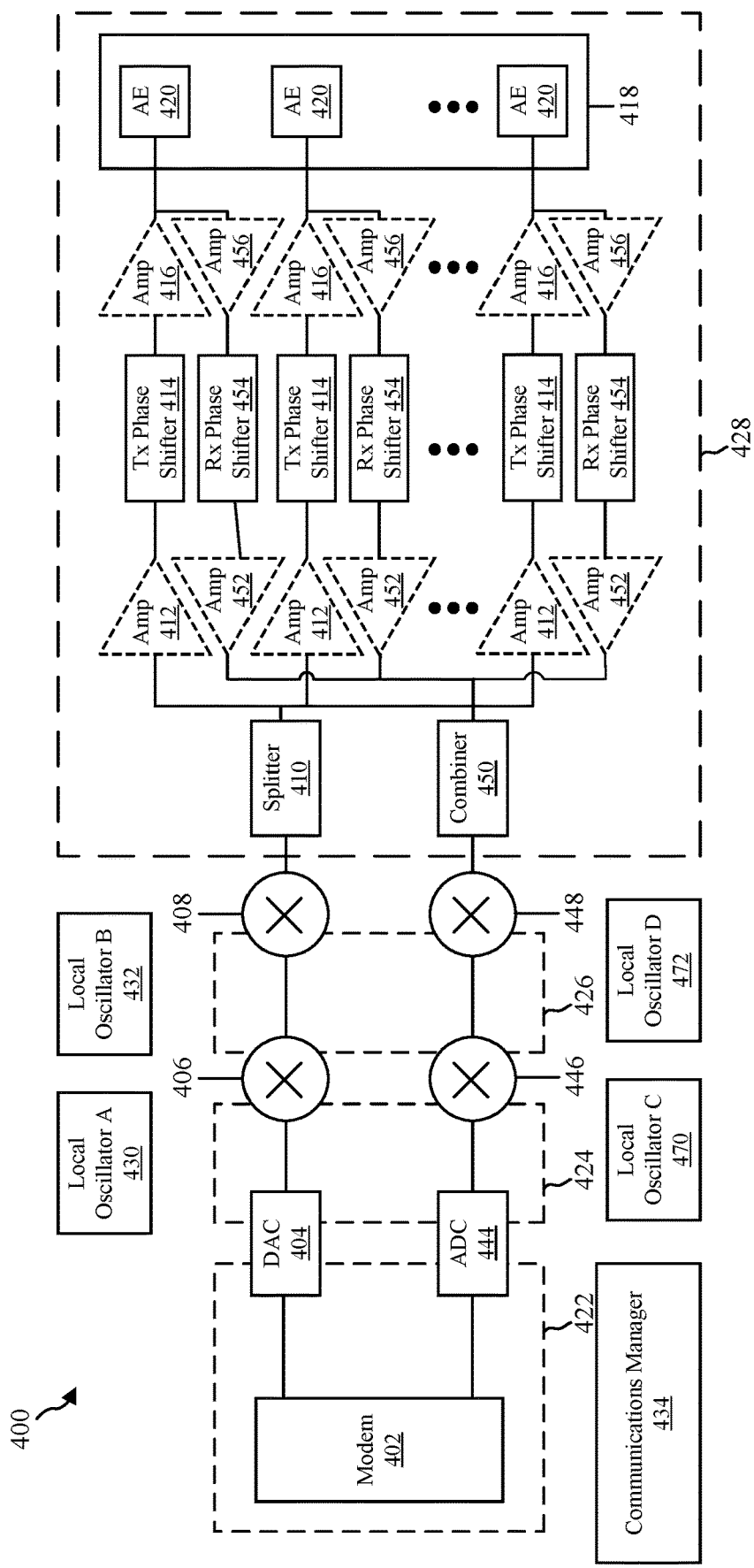
FIG. 4 illustrates an example of an architecture that supports determining sub-dominant clusters in a mmW channel in accordance with aspects of the present disclosure.

FIG. 4 illustrates an example of an architecture 400 that supports determining sub-dominant clusters in a mmW channel in accordance with aspects of the present disclosure. In some examples, architecture 400 may implement aspects of wireless communication systems 100 and/or 200 and/or RSRP tables 300. In some aspects, diagram 400 may be an example of the transmitting device (e.g., a first wireless device) and/or a receiving device (e.g., a second wireless device) as described herein.

Broadly, FIG. 4 is a diagram illustrating example hardware components of a wireless device in accordance with certain aspects of the disclosure. The illustrated components may include those that may be used for antenna element selection and/or for beamforming for transmission of wireless signals. There are numerous architectures for antenna element selection and implementing phase shifting, one example of which is illustrated here. The architecture 400 includes a modem (modulator/demodulator) 402, a digital to analog converter (DAC) 404, a first mixer 406, a second mixer 408, and a splitter 410. The architecture 400 also includes a plurality of first amplifiers 412, a plurality of phase shifters 414, a plurality of second amplifiers 416, and an antenna array 418 that includes a plurality of antenna elements 420. Transmission lines or other waveguides, wires, traces, or the like are shown connecting the various components to illustrate how signals to be transmitted may travel between components. Boxes 422, 424, 426, and 428 indicate regions in the architecture 400 in which different types of signals travel or are processed. Specifically, box 422 indicates a region in which digital baseband signals travel or are processed, box 424 indicates a region in which analog baseband signals travel or are processed, box 426 indicates a region in which analog intermediate frequency (IF) signals travel or are processed, and box 428 indicates a region in which analog RF signals travel or are processed. The architecture also includes a local oscillator A 430, a local oscillator B 432, and a communications manager 434.

Each of the antenna elements 420 may include one or more sub-elements (not shown) for radiating or receiving RF signals. For example, a single antenna element 420 may include a first sub-element cross-polarized with a second sub-element that can be used to independently transmit cross-polarized signals. The antenna elements 420 may include patch antennas or other types of antennas arranged in a linear, two dimensional, or other pattern. A spacing between antenna elements 420 may be such that signals with a desired wavelength transmitted separately by the antenna elements 420 may interact or interfere (e.g., to form a desired beam). For example, given an expected range of wavelengths or frequencies, the spacing may provide a quarter wavelength, half wavelength, or other fraction of a wavelength of spacing between neighboring antenna elements 420 to allow for interaction or interference of signals transmitted by the separate antenna elements 420 within that expected range.

The modem 402 processes and generates digital baseband signals and may also control operation of the DAC 404, first and second mixers 406, 408, splitter 410, first amplifiers 412, phase shifters 414, and/or the second amplifiers 416 to transmit signals via one or more or all of the antenna elements 420. The modem 402 may process signals and control operation in accordance with a communication standard such as a wireless standard discussed herein. The DAC 404 may convert digital baseband signals received from the modem 402 (and that are to be transmitted) into analog baseband signals. The first mixer 406 upconverts analog baseband signals to analog IF signals within an IF using a local oscillator A 430. For example, the first mixer 406 may mix the signals with an oscillating signal generated by the local oscillator A 430 to "move" the baseband analog signals to the IF. In some cases, some processing or filtering (not shown) may take place at the IF. The second mixer 408 upconverts the analog IF signals to analog RF signals using the local oscillator B 432. Similarly to the first mixer, the second mixer 408 may mix the signals with an oscillating signal generated by the local oscillator B 432 to "move" the IF analog signals to the RF, or the frequency at which signals will be transmitted or received. The modem 402 and/or the communications manager 434 may adjust the frequency of local oscillator A 430 and/or the local oscillator B 432 so that a desired IF and/or RF frequency is produced and used to facilitate processing and transmission of a signal within a desired bandwidth.

In the illustrated architecture 400, signals upconverted by the second mixer 408 are split or duplicated into multiple signals by the splitter 410. The splitter 410 in architecture 400 splits the RF signal into a plurality of identical or nearly identical RF signals, as denoted by its presence in box 428. In other examples, the split may take place with any type of signal including with baseband digital, baseband analog, or IF analog signals. Each of these signals may correspond to an antenna element 420 and the signal travels through and is processed by amplifiers 412, 416, phase shifters 414, and/or other elements corresponding to the respective antenna element 420 to be provided to and transmitted by the corresponding antenna element 420 of the antenna array 418. In one example, the splitter 410 may be an active splitter that is connected to a power supply and provides some gain so that RF signals exiting the splitter 410 are at a power level equal to or greater than the signal entering the splitter 410. In another example, the splitter 410 is a passive splitter that is not connected to power supply and the RF signals exiting the splitter 410 may be at a power level lower than the RF signal entering the splitter 410.

After being split by the splitter 410, the resulting RF signals may enter an amplifier, such as a first amplifier 412, or a phase shifter 414 corresponding to an antenna element 420. The first and second amplifiers 412, 416 are illustrated with dashed lines because one or both of them might not be necessary in some implementations. In one implementation, both the first amplifier 412 and second amplifier 416 are present. In another, neither the first amplifier 412 nor the second amplifier 416 is present. In other implementations, one of the two amplifiers 412, 416 is present but not the other. By way of example, if the splitter 410 is an active splitter, the first amplifier 412 may not be used. By way of further example, if the phase shifter 414 is an active phase shifter that can provide a gain, the second amplifier 416 might not be used. The amplifiers 412, 416 may provide a desired level of positive or negative gain. A positive gain (positive dB) may be used to increase an amplitude of a signal for radiation by a specific antenna element 420. A negative gain (negative dB) may be used to decrease an amplitude and/or suppress radiation of the signal by a specific antenna element. Each of the amplifiers 412, 416 may be controlled independently (e.g., by the modem 402 or communications manager 434) to provide independent control of the gain for each antenna element 420. For example, the modem 402 and/or the communications manager 434 may have at least one control line connected to each of the splitter 410, first amplifiers 412, phase shifters 414, and/or second amplifiers 416 which may be used to configure a gain to provide a desired amount of gain for each component and thus each antenna element 420.

The phase shifter 414 may provide a configurable phase shift or phase offset to a corresponding RF signal to be transmitted. The phase shifter 414 could be a passive phase shifter not directly connected to a power supply. Passive phase shifters might introduce some insertion loss. The second amplifier 416 could boost the signal to compensate for the insertion loss. The phase shifter 414 could be an active phase shifter connected to a power supply such that the active phase shifter provides some amount of gain or prevents insertion loss. The settings of each of the phase shifters 414 are independent meaning that each can be set to provide a desired amount of phase shift or the same amount of phase shift or some other configuration. The modem 402 and/or the communications manager 434 may have at least one control line connected to each of the phase shifters 414 and which may be used to configure the phase shifters 414 to provide a desired amounts of phase shift or phase offset between antenna elements 420.

In the illustrated architecture 400, RF signals received by the antenna elements 420 are provided to one or more of first amplifier 456 to boost the signal strength. The first amplifier 456 may be connected to the same antenna arrays 418, e.g., for TDD operations. The first amplifier 456 may be connected to different antenna arrays 418. The boosted RF signal is input into one or more of phase shifter 454 to provide a configurable phase shift or phase offset for the corresponding received RF signal. The phase shifter 454 may be an active phase shifter or a passive phase shifter. The settings of the phase shifters 454 are independent, meaning that each can be set to provide a desired amount of phase shift or the same amount of phase shift or some other configuration. The modem 402 and/or the communications manager 434 may have at least one control line connected to each of the phase shifters 454 and which may be used to configure the phase shifters 454 to provide a desired amount of phase shift or phase offset between antenna elements 420.

The outputs of the phase shifters 454 may be input to one or more second amplifiers 452 for signal amplification of the phase shifted received RF signals. The second amplifiers 452 may be individually configured to provide a configured amount of gain. The second amplifiers 452 may be individually configured to provide an amount of gain to ensure that the signal input to combiner 450 have the same magnitude. The amplifiers 452 and/or 456 are illustrated in dashed lines because they might not be necessary in some implementations. In one implementation, both the amplifier 452 and the amplifier 456 are present. In another, neither the amplifier 452 nor the amplifier 456 are present. In other implementations, one of the amplifiers 452, 456 is present but not the other.

In the illustrated architecture 400, signals output by the phase shifters 454 (via the amplifiers 452 when present) are combined in combiner 450. The combiner 450 in architecture combines the RF signal into a signal, as denoted by its presence in box 428. The combiner 450 may be a passive combiner, e.g., not connected to a power source, which may result in some insertion loss. The combiner 450 may be an active combiner, e.g., connected to a power source, which may result in some signal gain. When combiner 450 is an active combiner, it may provide a different (e.g., configurable) amount of gain for each input signal so that the input signals have the same magnitude when they are combined. When combiner 450 is an active combiner, it may not need the second amplifier 452 because the active combiner may provide the signal amplification.

The output of the combiner 450 is input into mixers 448 and 446. Mixers 448 and 446 generally down convert the received RF signal using inputs from local oscillators 472 and 470, respectively, to create intermediate or baseband signals that carry the encoded and modulated information. The output of the mixers 448 and 446 are input into an analog-to-digital converter (ADC) 444 for conversion to analog signals. The analog signals output from ADC 444 is input to modem 402 for baseband processing, e.g., decoding, de-interleaving, etc.

The architecture 400 is given by way of example to illustrate an architecture for transmitting and/or receiving signals. It will be understood that the architecture 400 and/or each portion of the architecture 400 may be repeated multiple times within an architecture to accommodate or provide an arbitrary number of RF chains, antenna elements, and/or antenna panels. Furthermore, numerous alternate architectures are possible and contemplated. For example, although a single antenna array 418 is shown, two, three, or more antenna arrays may be included each with one or more of their own corresponding amplifiers, phase shifters, splitters, mixers, DACs, ADCs, and/or modems. For example, a single UE may include two, four or more antenna arrays for transmitting or receiving signals at different physical locations on the UE or in different directions.

Furthermore, mixers, splitters, amplifiers, phase shifters and other components may be located in different signal type areas (e.g., different ones of the boxes 422, 424, 426, 428) in different implemented architectures. For example, a split of the signal to be transmitted into a plurality of signals may take place at the analog RF, analog IF, analog baseband, or digital baseband frequencies in different examples. Similarly, amplification, and/or phase shifts may also take place at different frequencies. For example, in some contemplated implementations, one or more of the splitter 410, amplifiers 412, 416, or phase shifters 414 may be located between the DAC 404 and the first mixer 406 or between the first mixer 406 and the second mixer 408. In one example, the functions of one or more of the components may be combined into one component. For example, the phase shifters 414 may perform amplification to include or replace the first and/or or second amplifiers 412, 416. By way of another example, a phase shift may be implemented by the second mixer 408 to obviate the need for a separate phase shifter 414. This technique is sometimes called local oscillator phase shifting. In one implementation of this configuration, there may be a plurality of IF to RF mixers (e.g., for each antenna element chain) within the second mixer 408 and the local oscillator B 432 would supply different local oscillator signals (with different phase offsets) to each IF to RF mixer.

The modem 402 and/or the communications manager 434 may control one or more of the other components 404-472 to select one or more antenna elements 420 and/or to form beams for transmission of one or more signals. For example, the antenna elements 420 may be individually selected or deselected for transmission of a signal (or signals) by controlling an amplitude of one or more corresponding amplifiers, such as the first amplifiers 412 and/or the second amplifiers 416. Beamforming includes generation of a beam using a plurality of signals on different antenna elements where one or more or all of the plurality signals are shifted in phase relative to each other. The formed beam may carry physical or higher layer reference signals or information. As each signal of the plurality of signals is radiated from a respective antenna element 420, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 418) can be dynamically controlled by modifying the phase shifts or phase offsets imparted by the phase shifters 414 and amplitudes imparted by the amplifiers 412, 416 of the plurality of signals relative to each other.

The communications manager 434 may, when architecture 400 is configured as a receiving device, transmit a first beam measurement report to a first wireless device, the first beam measurement report indicating a first set of beam measurements for a wireless channel between the first wireless device and the second wireless device. The communications manager 434 may receive from the first wireless device a cluster validity metric for at least one beam in the first beam measurement report. The communications manager 434 may transmit to the first wireless device a second beam measurement report based at least in part on the cluster validity metric, the second beam measurement report indicating a second set of beam measurements for the wireless channel, as discussed herein. The communications manager 434 may, when architecture 400 is configured as a transmitting device, receive a first beam measurement report from a second wireless device, the first beam measurement report indicating a first set of beam measurements for a wireless channel between the first wireless device and the second wireless device. The communications manager 434 may transmit to the second wireless device a cluster validity metric for at least one beam in the first beam measurement report. The communications manager 434 may receive from the second wireless device, in response to transmitting the cluster validity metric, a second beam measurement report indicating a second set of beam measurements for the wireless channel. The communications manager 434 may select a beam for transmitting to the second wireless device based at least in part on the first and second beam measurement reports, as discussed herein. The communications manager 434 may be located partially or fully within one or more other components of the architecture 400. For example, the communications manager 434 may be located within the modem 402 in at least one implementation.

Figure 5:
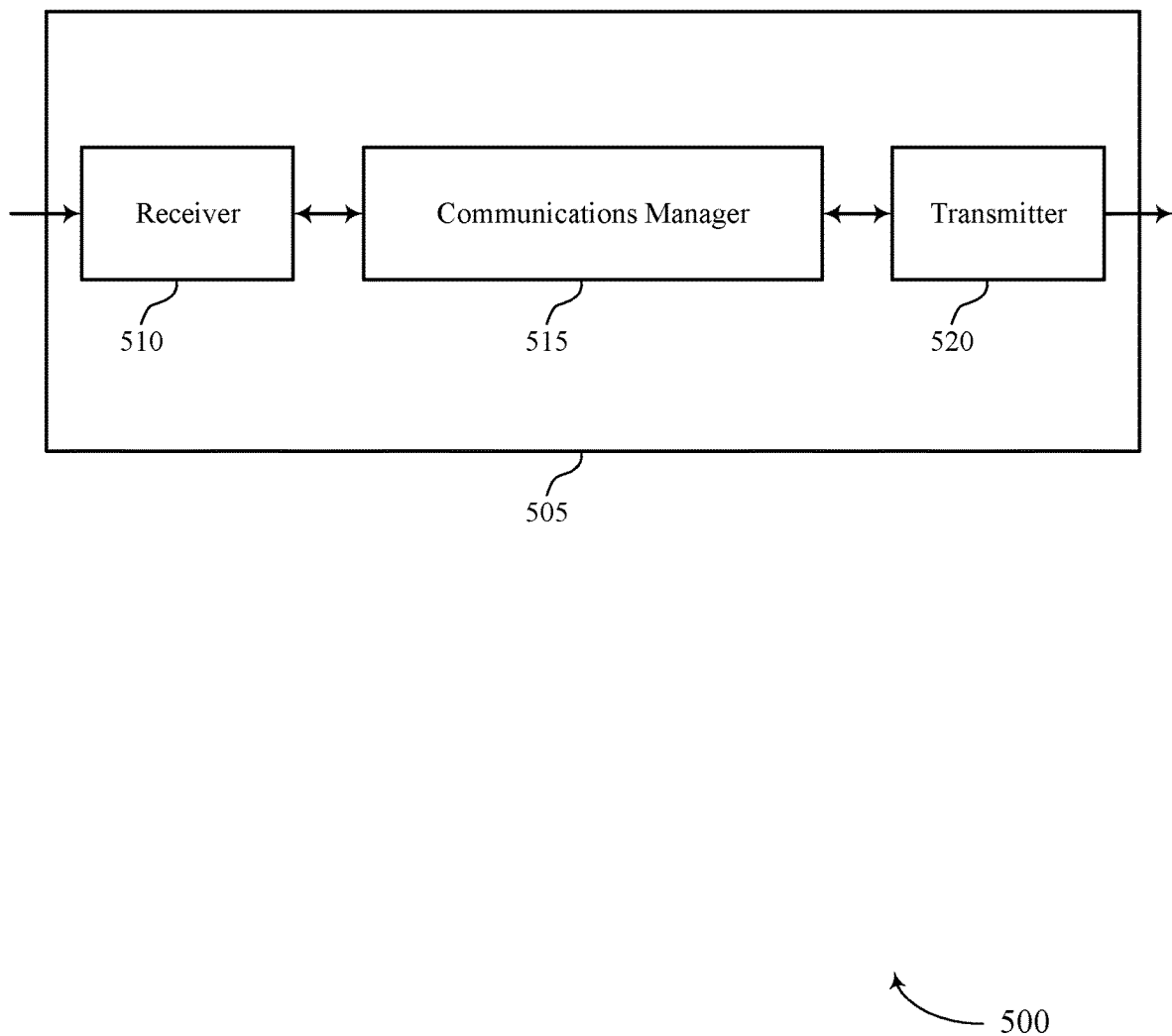
FIGS. 5 and 6 show block diagrams of devices that support determining sub-dominant clusters in a mmW channel in accordance with aspects of the present disclosure.

FIG. 5 shows a block diagram 500 of a device 505 that supports determining sub-dominant clusters in a mmW channel in accordance with aspects of the present disclosure. The device 505 may be an example of aspects of a UE 115 or base station 105 as described herein. The device 505 may include a receiver 510, a communications manager 515, and a transmitter 520. The device 505 may also include a processor. Each of these components may be in communication with one another (e.g., via one or more buses). Receiver 510 may receive information such as packets, user data, or control information associated with various information channels (e.g., control channels, data channels, and information related to determining sub-dominant clusters in a mmW channel, etc.). Information may be passed on to other components of the device 505. The receiver 510 may be an example of aspects of the transceiver 820 or 920 as described with reference to FIGS. 8 and 9. The receiver 510 may utilize a single antenna or a set of antennas.

The communications manager 515 may receive a first beam measurement report from a second wireless device, the first beam measurement report indicating a first set of beam measurements for a wireless channel between the first wireless device and the second wireless device, receive from the second wireless device, in response to transmitting the cluster validity metric, a second beam measurement report indicating a second set of beam measurements for the wireless channel, transmit to the second wireless device a cluster validity metric for at least one beam in the first beam measurement report, and select a beam for transmitting to the second wireless device based on the first and second beam measurement reports. The communications manager 515 may also transmit a first beam measurement report to a first wireless device, the first beam measurement report indicating a first set of beam measurements for a wireless channel between the first wireless device and the second wireless device, transmit to the first wireless device a second beam measurement report based on the cluster validity metric, the second beam measurement report indicating a second set of beam measurements for the wireless channel, and receive from the first wireless device a cluster validity metric for at least one beam in the first beam measurement report. The communications manager 515 may be an example of aspects of the communications manager 810 or 910 as described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processing (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure. Transmitter 520 may transmit signals generated by other components of the device 505. In some examples, the transmitter 520 may be collocated with a receiver 510 in a transceiver module. For example, the transmitter 520 may be an example of aspects of the transceiver 820 or 920 as described with reference to FIGS. 8 and 9. The transmitter 520 may utilize a single antenna or a set of antennas. In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device 505 to perform a throughput degradation technique based on a time delay between communications received over multiple component carriers. The throughput degradation technique may involve the device 505 limiting CQI, RI, or other parameters in a CSF, which may improve throughput. Such techniques also may mitigate the effects of the time delay between component carriers. Based on techniques for implementing sidelink groupcast reachability based scheduling as described herein, a processor of a UE 115 (e.g., controlling the receiver 510, the transmitter 520, or the transceiver 820 as described with reference to FIG. 8) may increase reliability and throughput when utilizing multiple component carriers in a carrier aggregation communications scheme.

Figure 6:
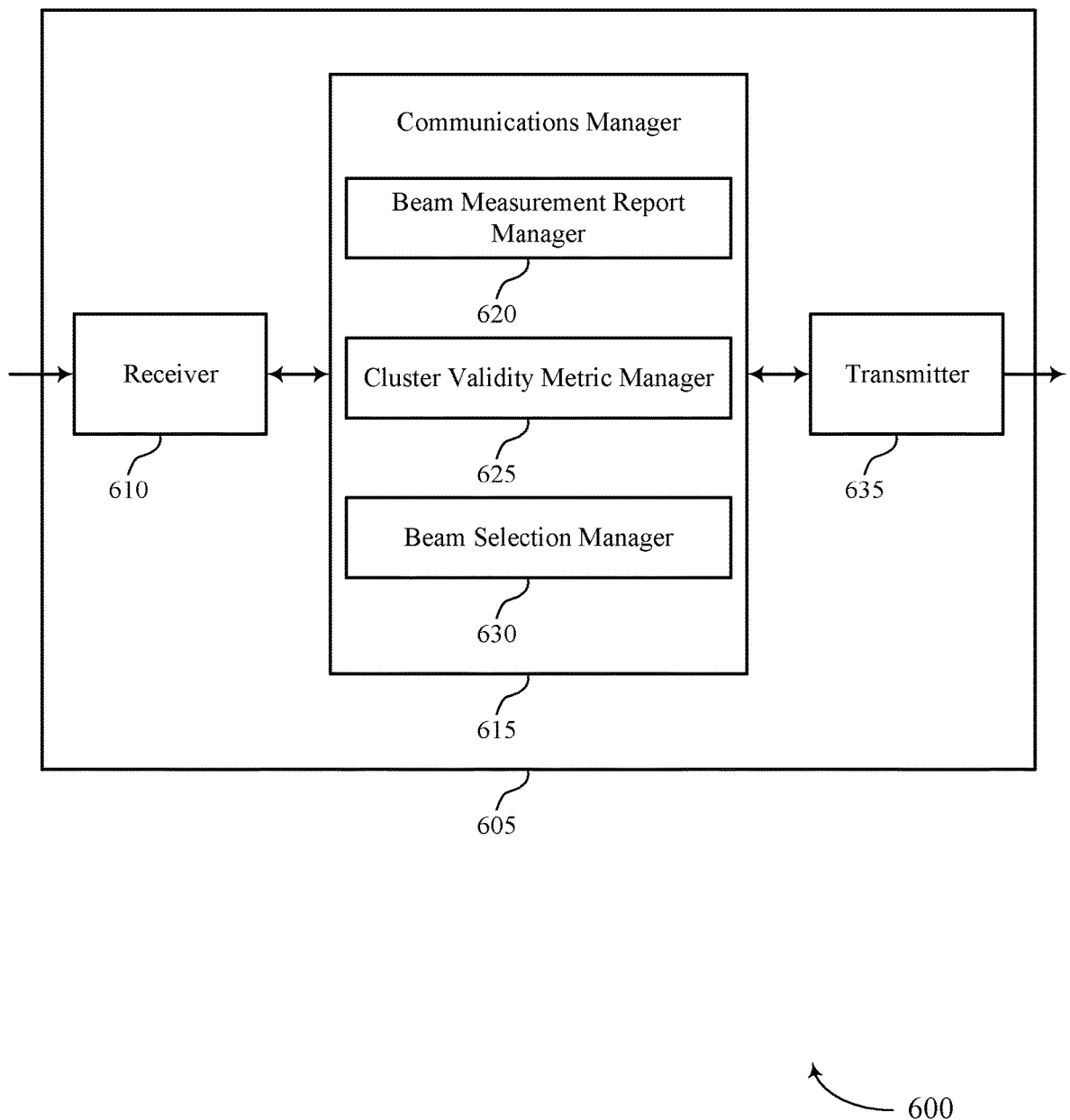

FIG. 6 shows a block diagram 600 of a device 605 that supports determining sub-dominant clusters in a mmW channel in accordance with aspects of the present disclosure. The device 605 may be an example of aspects of a device 505, a UE 115, or a base station 105 as described herein. The device 605 may include a receiver 610, a communications manager 615, and a transmitter 635. The device 605 may also include a processor. Each of these components may be in communication with one another (e.g., via one or more buses). Receiver 610 may receive information such as packets, user data, or control information associated with various information channels (e.g., control channels, data channels, and information related to determining sub-dominant clusters in a mmW channel, etc.). Information may be passed on to other components of the device 605. The receiver 610 may be an example of aspects of the transceiver 820 or 920 as described with reference to FIGS. 8 and 9. The receiver 610 may utilize a single antenna or a set of antennas.

The communications manager 615 may be an example of aspects of the communications manager 515 as described herein. The communications manager 615 may include a beam measurement report manager 620, a cluster validity metric manager 625, and a beam selection manager 630. The communications manager 615 may be an example of aspects of the communications manager 810 or 910 as described herein. The beam measurement report manager 620 may receive a first beam measurement report from a second wireless device, the first beam measurement report indicating a first set of beam measurements for a wireless channel between the first wireless device and the second wireless device and receive from the second wireless device, in response to transmitting the cluster validity metric, a second beam measurement report indicating a second set of beam measurements for the wireless channel. The cluster validity metric manager 625 may transmit to the second wireless device a cluster validity metric for at least one beam in the first beam measurement report. The beam selection manager 630 may select a beam for transmitting to the second wireless device based on the first and second beam measurement reports.

The beam measurement report manager 620 may transmit a first beam measurement report to a first wireless device, the first beam measurement report indicating a first set of beam measurements for a wireless channel between the first wireless device and the second wireless device and transmit to the first wireless device a second beam measurement report based on the cluster validity metric, the second beam measurement report indicating a second set of beam measurements for the wireless channel. The cluster validity metric manager 625 may receive from the first wireless device a cluster validity metric for at least one beam in the first beam measurement report. Transmitter 635 may transmit signals generated by other components of the device 605. In some examples, the transmitter 635 may be collocated with a receiver 610 in a transceiver module. For example, the transmitter 635 may be an example of aspects of the transceiver 820 or 920 as described with reference to FIGS. 8 and 9. The transmitter 635 may utilize a single antenna or a set of antennas.

Figure 7:
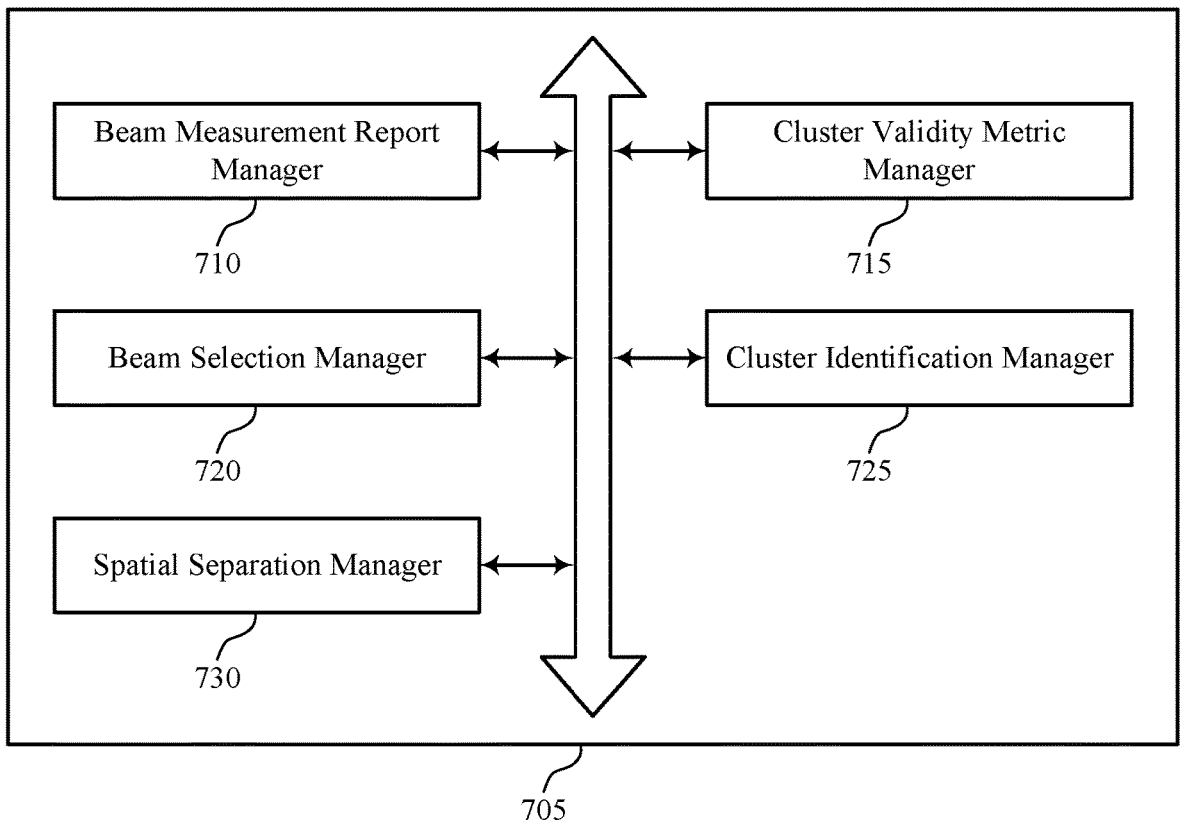
FIG. 7 shows a block diagram of a communications manager that supports determining sub-dominant clusters in a mmW channel in accordance with aspects of the present disclosure.

FIG. 7 shows a block diagram 700 of a communications manager 705 that supports determining sub-dominant clusters in a mmW channel in accordance with aspects of the present disclosure. The communications manager 705 may be an example of aspects of a communications manager 515, a communications manager 615, or a communications manager 810 described herein. The communications manager 705 may include a beam measurement report manager 710, a cluster validity metric manager 715, a beam selection manager 720, a cluster identification manager 725, and a spatial separation manager 730. Each of these modules may communicate, directly or indirectly, with one another (e.g., via one or more buses).

The beam measurement report manager 710 may receive a first beam measurement report from a second wireless device, the first beam measurement report indicating a first set of beam measurements for a wireless channel between the first wireless device and the second wireless device. In some examples, the beam measurement report manager 710 may receive from the second wireless device, in response to transmitting the cluster validity metric, a second beam measurement report indicating a second set of beam measurements for the wireless channel. In some examples, the beam measurement report manager 710 may transmit a first beam measurement report to a first wireless device, the first beam measurement report indicating a first set of beam measurements for a wireless channel between the first wireless device and the second wireless device.

In some examples, the beam measurement report manager 710 may transmit to the first wireless device a second beam measurement report based on the cluster validity metric, the second beam measurement report indicating a second set of beam measurements for the wireless channel. In some cases, the first beam measurement report indicates, for at least one beam associated with the first set of beam measurements, a transmit beam index and a received power level for the transmit beam and a corresponding receive beam. In some cases, the first beam measurement report indicates, for at least one beam associated with the first set of beam measurements, a transmit beam index and a received power level for the transmit beam and a corresponding receive beam. The cluster validity metric manager 715 may transmit to the second wireless device a cluster validity metric for at least one beam in the first beam measurement report. In some examples, the cluster validity metric manager 715 may receive from the first wireless device a cluster validity metric for at least one beam in the first beam measurement report. In some cases, an antenna configuration, a codebook configuration, a cluster identification tolerance metric, a channel statistic, or a beam width for the first set of beam measurements.

In some cases, an antenna configuration, a codebook configuration, a cluster identification tolerance metric, a channel statistic, or a beam width for the first set of beam measurements. The beam selection manager 720 may select a beam for transmitting to the second wireless device based on the first and second beam measurement reports. In some examples, the beam selection manager 720 may transmit to the second wireless device an indication of the selected beam. In some examples, the beam selection manager 720 may receive an indication of a selected beam from the first wireless device. The cluster identification manager 725 may identify, based on the first and second set of beam measurements, one or more distinct clusters associated with the wireless channel, where the beam is selected based on the identified one or more distinct clusters. In some examples, the cluster identification manager 725 may transmit to the second wireless device an indication of the identified one or more distinct clusters to the second wireless device.

In some examples, the cluster identification manager 725 may identify, based on the first set of beam measurements or the second set of beam measurements, one or more distinct clusters associated with the wireless channel. In some examples, the cluster identification manager 725 may receive an indication of an identified one or more distinct clusters from the first wireless device. The spatial separation manager 730 may determine, based on the first set of beam measurements, that a spatial separation between a first beam corresponding to a first distinct cluster and a second candidate beam fails to satisfy a separation threshold at the first wireless device, where the cluster validity metric for the second candidate beam is transmitted to the second wireless device based on the spatial separation failing to satisfy the separation threshold.

In some examples, the spatial separation manager 730 may transmit to the second wireless device an indication of a minimum spatial separation between beams for the second set of beam measurements indicated in the second beam measurement report. In some examples, the spatial separation manager 730 may transmit to the second wireless device an indication that the second beam fails to satisfy the separation threshold with respect to the first beam corresponding to the first distinct cluster. In some examples, the spatial separation manager 730 may transmit to the second wireless device an indication of an increased beam count for the second beam measurement report. In some examples, the spatial separation manager 730 may transmit to the second wireless device an indication of a codebook configuration used by the first wireless device.

In some examples, the spatial separation manager 730 may determine, based on the cluster validity metric, that a spatial separation between a first beam corresponding to a first distinct cluster and a second candidate beam fail to satisfy a separation threshold, where the second set of beam measurements are based on the spatial separation failing to satisfy the separation threshold. In some examples, the spatial separation manager 730 may receive an indication of a minimum spatial separation between beams for the second set of beam measurements. In some examples, the spatial separation manager 730 may receive an indication that the second candidate beam fails to satisfy the separation threshold. In some examples, the spatial separation manager 730 may receive, based on the cluster validity metric, an indication of an increased beam count for the second beam measurement report. In some examples, the spatial separation manager 730 may receive an indication of a codebook configuration used by the first wireless device.

Figure 8:
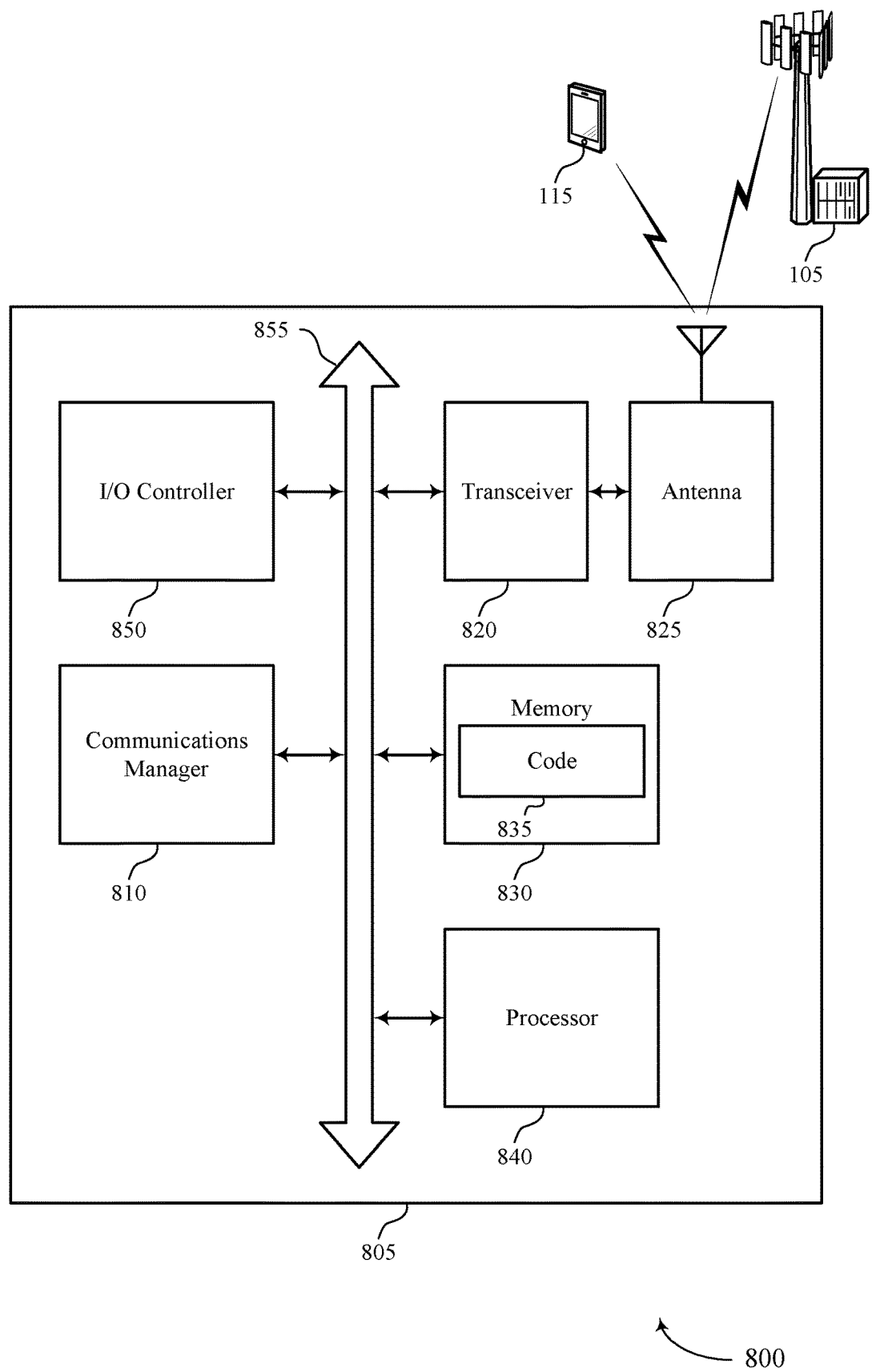
FIG. 8 shows a diagram of a system including a user equipment (UE) that supports determining sub-dominant clusters in a mmW channel in accordance with aspects of the present disclosure.

FIG. 8 shows a diagram of a system 800 including a device 805 that supports determining sub-dominant clusters in a mmW channel in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, a transceiver 820, an antenna 825, memory 830, a processor 840, and an I/O controller 850. These components may be in electronic communication via one or more buses (e.g., bus 855).

The communications manager 810 may receive a first beam measurement report from a second wireless device, the first beam measurement report indicating a first set of beam measurements for a wireless channel between the first wireless device and the second wireless device, receive from the second wireless device, in response to transmitting the cluster validity metric, a second beam measurement report indicating a second set of beam measurements for the wireless channel, transmit to the second wireless device a cluster validity metric for at least one beam in the first beam measurement report, and select a beam for transmitting to the second wireless device based on the first and second beam measurement reports. The communications manager 810 may also transmit a first beam measurement report to a first wireless device, the first beam measurement report indicating a first set of beam measurements for a wireless channel between the first wireless device and the second wireless device, transmit to the first wireless device a second beam measurement report based on the cluster validity metric, the second beam measurement report indicating a second set of beam measurements for the wireless channel, and receive from the first wireless device a cluster validity metric for at least one beam in the first beam measurement report.

Transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas. In some cases, the wireless device may include a single antenna 825. However, in some cases, the device may have more than one antenna 825, which may be capable of concurrently transmitting or receiving multiple wireless transmissions.

The memory 830 may include random-access memory (RAM), read-only memory (ROM), or a combination thereof. The memory 830 may store computer-readable code 835 including instructions that, when executed by a processor (e.g., the processor 840) cause the device to perform various functions described herein. In some cases, the memory 830 may contain, among other things, a basic input/output system (BIOS) which may control basic hardware or software operation such as the interaction with peripheral components or devices. The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting determining sub-dominant clusters in a mmW channel).

The I/O controller 850 may manage input and output signals for the device 805. The I/O controller 850 may also manage peripherals not integrated into the device 805. In some cases, the I/O controller 850 may represent a physical connection or port to an external peripheral. In some cases, the I/O controller 850 may utilize an operating system such as iOS®, ANDROID®, MS-DOS®, MS-WINDOWS®, OS/2®, UNIX®, LINUX®, or another known operating system. In other cases, the I/O controller 850 may represent or interact with a modem, a keyboard, a mouse, a touchscreen, or a similar device. In some cases, the I/O controller 850 may be implemented as part of a processor. In some cases, a user may interact with the device 805 via the I/O controller 850 or via hardware components controlled by the I/O controller 850. The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
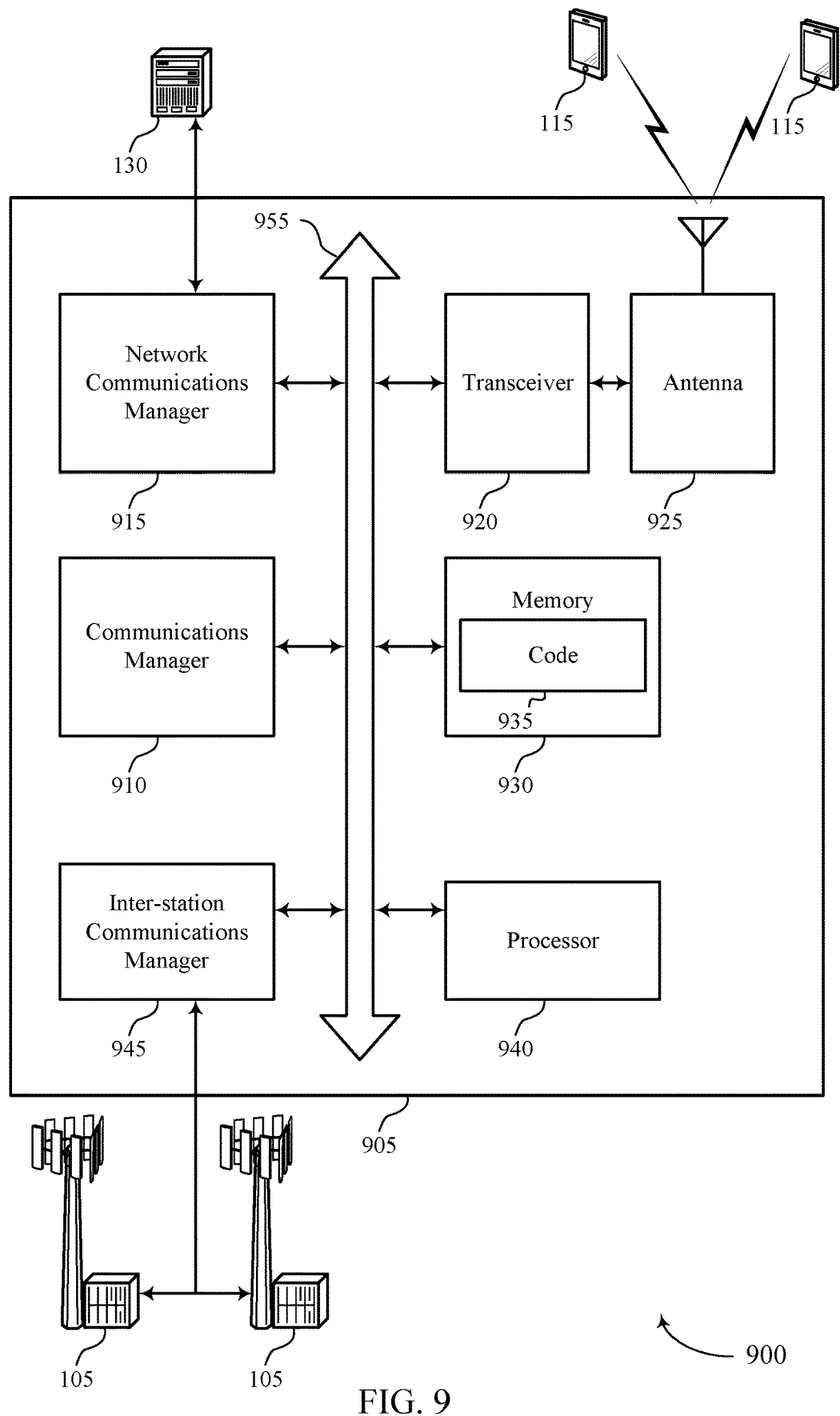
FIG. 9 shows a diagram of a system including a base station that supports determining sub-dominant clusters in a mmW channel in accordance with aspects of the present disclosure.

FIG. 9 shows a diagram of a system 900 including a device 905 that supports determining sub-dominant clusters in a mmW channel in accordance with aspects of the present disclosure. The device 905 may be an example of or include the components of device 505, device 605, or a base station 105 as described herein. The device 905 may include components for bi-directional voice and data communications including components for transmitting and receiving communications, including a communications manager 910, a network communications manager 915, a transceiver 920, an antenna 925, memory 930, a processor 940, and an inter-station communications manager 945. These components may be in electronic communication via one or more buses (e.g., bus 955).

The communications manager 910 may receive a first beam measurement report from a second wireless device, the first beam measurement report indicating a first set of beam measurements for a wireless channel between the first wireless device and the second wireless device, receive from the second wireless device, in response to transmitting the cluster validity metric, a second beam measurement report indicating a second set of beam measurements for the wireless channel, transmit to the second wireless device a cluster validity metric for at least one beam in the first beam measurement report, and select a beam for transmitting to the second wireless device based on the first and second beam measurement reports. The communications manager 910 may also transmit a first beam measurement report to a first wireless device, the first beam measurement report indicating a first set of beam measurements for a wireless channel between the first wireless device and the second wireless device, transmit to the first wireless device a second beam measurement report based on the cluster validity metric, the second beam measurement report indicating a second set of beam measurements for the wireless channel, and receive from the first wireless device a cluster validity metric for at least one beam in the first beam measurement report.

Network communications manager 915 may manage communications with the core network (e.g., via one or more wired backhaul links). For example, the network communications manager 915 may manage the transfer of data communications for client devices, such as one or more UEs 115. Transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the wireless device may include a single antenna 925. However, in some cases, the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a BIOS which may control basic hardware or software operation such as the interaction with peripheral components or devices. The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting determining sub-dominant clusters in a mmW channel).

Inter-station communications manager 945 may manage communications with other base station 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, inter-station communications manager 945 may provide an X2 interface within an LTE/LTE-A wireless communication network technology to provide communication between base stations 105. The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
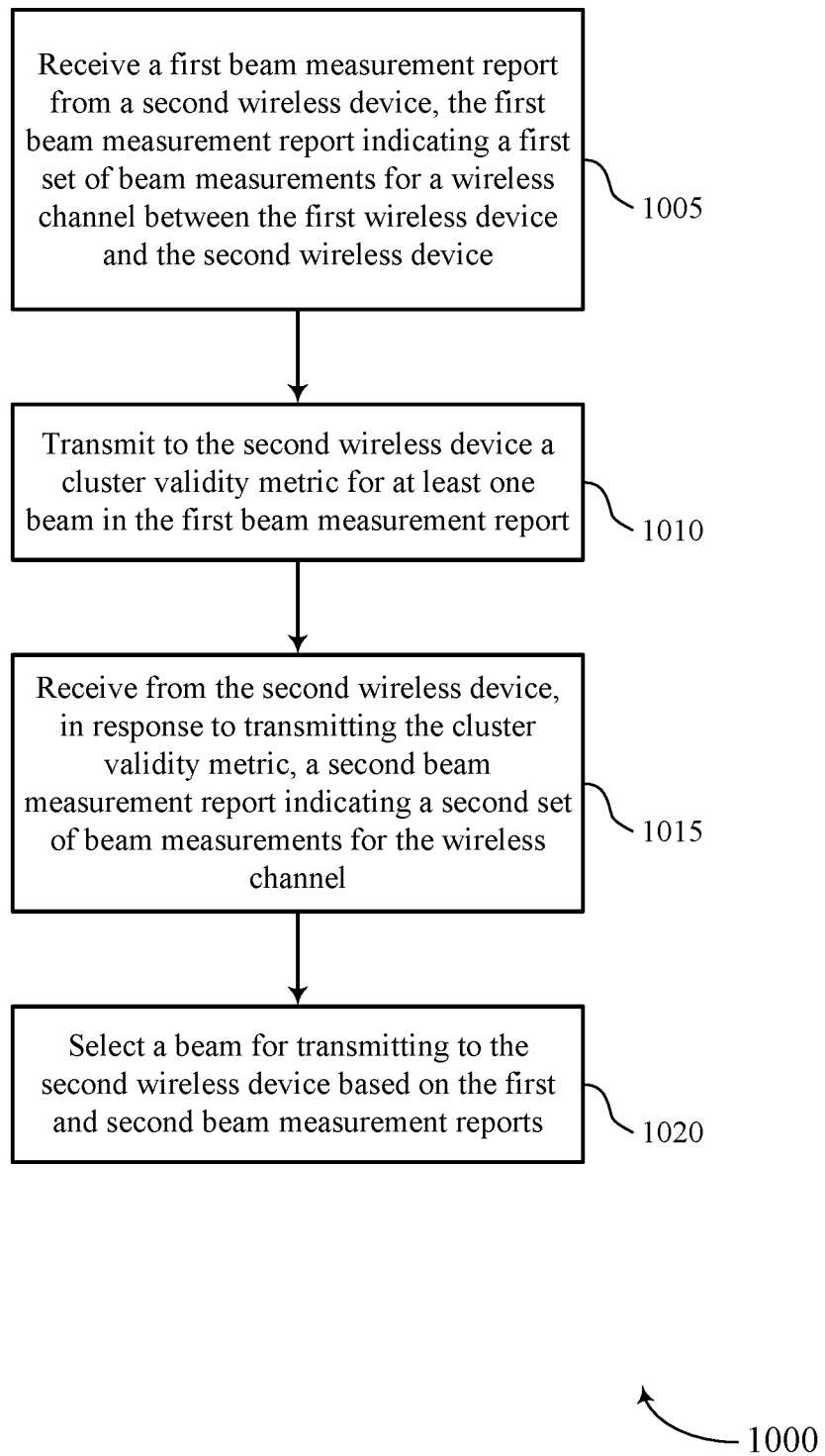
FIGS. 10 through 12 show flowcharts illustrating methods that support determining sub-dominant clusters in a mmW channel in accordance with aspects of the present disclosure.

FIG. 10 shows a flowchart illustrating a method 1000 that supports determining sub-dominant clusters in a mmW channel in accordance with aspects of the present disclosure. The operations of method 1000 may be implemented by a UE 115 or base station 105 or its components as described herein. For example, the operations of method 1000 may be performed by a communications manager as described with reference to FIGS. 5 through 9. In some examples, a UE or base station may execute a set of instructions to control the functional elements of the UE or base station to perform the functions described herein. Additionally or alternatively, a UE or base station may perform aspects of the functions described herein using special-purpose hardware.

At 1005, the UE or base station may receive a first beam measurement report from a second wireless device, the first beam measurement report indicating a first set of beam measurements for a wireless channel between the first wireless device and the second wireless device. The operations of 1005 may be performed according to the methods described herein. In some examples, aspects of the operations of 1005 may be performed by a beam measurement report manager as described with reference to FIGS. 5 through 9. At 1010, the UE or base station may transmit to the second wireless device a cluster validity metric for at least one beam in the first beam measurement report. The operations of 1010 may be performed according to the methods described herein. In some examples, aspects of the operations of 1010 may be performed by a cluster validity metric manager as described with reference to FIGS. 5 through 9.

At 1015, the UE or base station may receive from the second wireless device, in response to transmitting the cluster validity metric, a second beam measurement report indicating a second set of beam measurements for the wireless channel. The operations of 1015 may be performed according to the methods described herein. In some examples, aspects of the operations of 1015 may be performed by a beam measurement report manager as described with reference to FIGS. 5 through 9. At 1020, the UE or base station may select a beam for transmitting to the second wireless device based on the first and second beam measurement reports. The operations of 1020 may be performed according to the methods described herein. In some examples, aspects of the operations of 1020 may be performed by a beam selection manager as described with reference to FIGS. 5 through 9.

Figure 11:
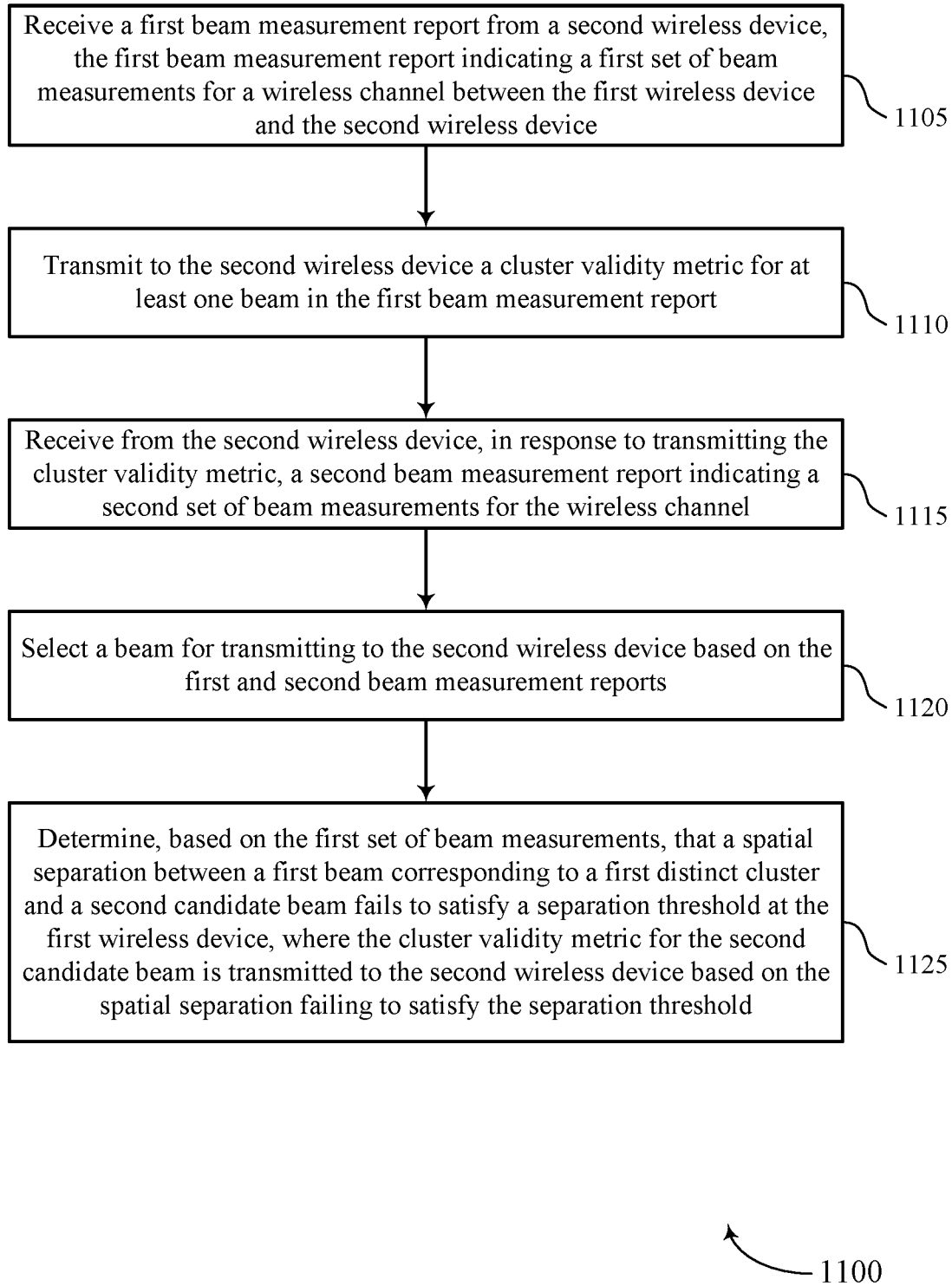

FIG. 11 shows a flowchart illustrating a method 1100 that supports determining sub-dominant clusters in a mmW channel in accordance with aspects of the present disclosure. The operations of method 1100 may be implemented by a UE 115 or base station 105 or its components as described herein. For example, the operations of method 1100 may be performed by a communications manager as described with reference to FIGS. 5 through 9. In some examples, a UE or base station may execute a set of instructions to control the functional elements of the UE or base station to perform the functions described herein. Additionally or alternatively, a UE or base station may perform aspects of the functions described herein using special-purpose hardware.

At 1105, the UE or base station may receive a first beam measurement report from a second wireless device, the first beam measurement report indicating a first set of beam measurements for a wireless channel between the first wireless device and the second wireless device. The operations of 1105 may be performed according to the methods described herein. In some examples, aspects of the operations of 1105 may be performed by a beam measurement report manager as described with reference to FIGS. 5 through 9. At 1110, the UE or base station may transmit to the second wireless device a cluster validity metric for at least one beam in the first beam measurement report. The operations of 1110 may be performed according to the methods described herein. In some examples, aspects of the operations of 1110 may be performed by a cluster validity metric manager as described with reference to FIGS. 5 through 9.

At 1115, the UE or base station may receive from the second wireless device, in response to transmitting the cluster validity metric, a second beam measurement report indicating a second set of beam measurements for the wireless channel. The operations of 1115 may be performed according to the methods described herein. In some examples, aspects of the operations of 1115 may be performed by a beam measurement report manager as described with reference to FIGS. 5 through 9. At 1120, the UE or base station may select a beam for transmitting to the second wireless device based on the first and second beam measurement reports. The operations of 1120 may be performed according to the methods described herein. In some examples, aspects of the operations of 1120 may be performed by a beam selection manager as described with reference to FIGS. 5 through 9.

At 1125, the UE or base station may determine, based on the first set of beam measurements, that a spatial separation between a first beam corresponding to a first distinct cluster and a second candidate beam fails to satisfy a separation threshold at the first wireless device, where the cluster validity metric for the second candidate beam is transmitted to the second wireless device based on the spatial separation failing to satisfy the separation threshold. The operations of 1125 may be performed according to the methods described herein. In some examples, aspects of the operations of 1125 may be performed by a spatial separation manager as described with reference to FIGS. 5 through 9.

Figure 12:
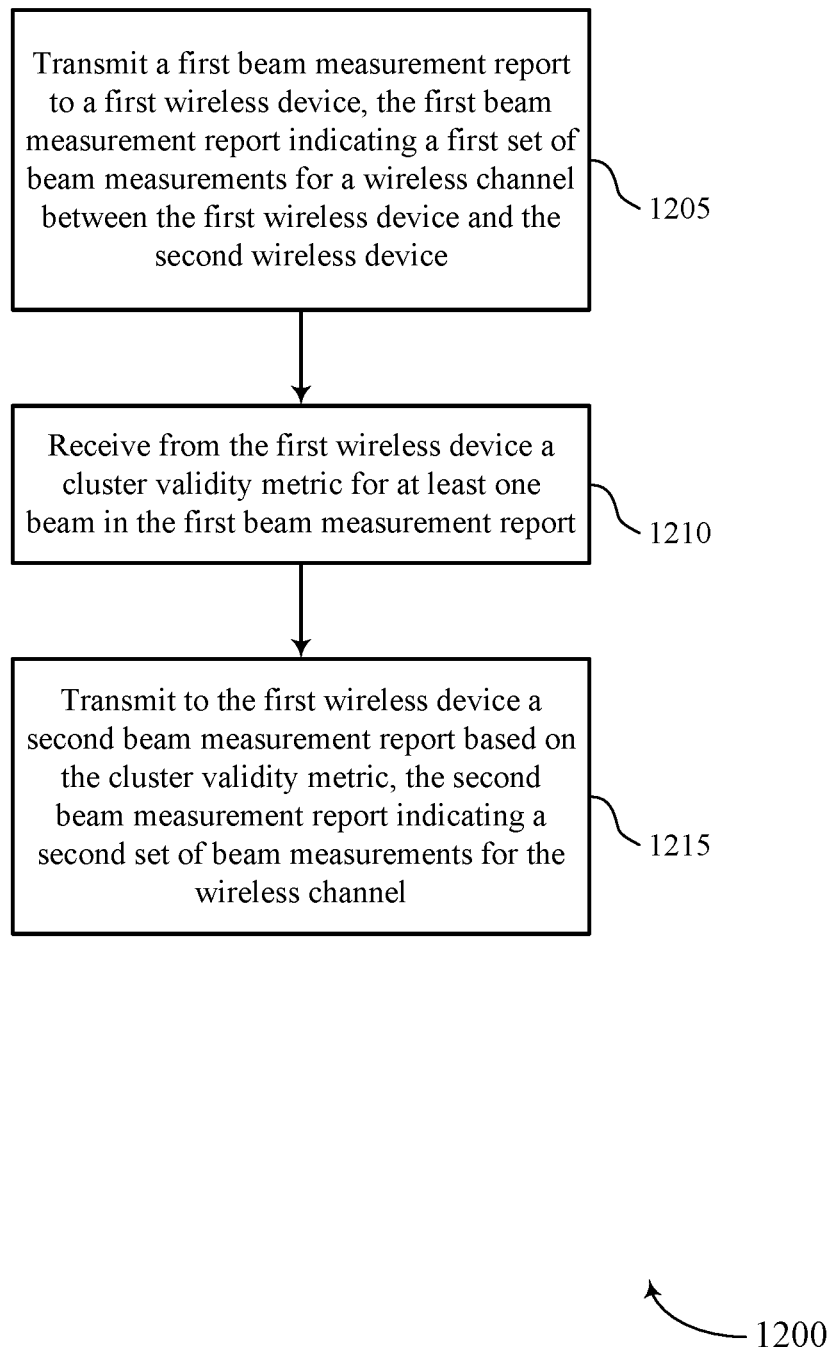

FIG. 12 shows a flowchart illustrating a method 1200 that supports determining sub-dominant clusters in a mmW channel in accordance with aspects of the present disclosure. The operations of method 1200 may be implemented by a UE 115 or base station 105 or its components as described herein. For example, the operations of method 1200 may be performed by a communications manager as described with reference to FIGS. 5 through 9. In some examples, a UE or base station may execute a set of instructions to control the functional elements of the UE or base station to perform the functions described herein. Additionally or alternatively, a UE or base station may perform aspects of the functions described herein using special-purpose hardware.

At 1205, the UE or base station may transmit a first beam measurement report to a first wireless device, the first beam measurement report indicating a first set of beam measurements for a wireless channel between the first wireless device and the second wireless device. The operations of 1205 may be performed according to the methods described herein. In some examples, aspects of the operations of 1205 may be performed by a beam measurement report manager as described with reference to FIGS. 5 through 9. At 1210, the UE or base station may receive from the first wireless device a cluster validity metric for at least one beam in the first beam measurement report. The operations of 1210 may be performed according to the methods described herein. In some examples, aspects of the operations of 1210 may be performed by a cluster validity metric manager as described with reference to FIGS. 5 through 9.

At 1215, the UE or base station may transmit to the first wireless device a second beam measurement report based on the cluster validity metric, the second beam measurement report indicating a second set of beam measurements for the wireless channel. The operations of 1215 may be performed according to the methods described herein. In some examples, aspects of the operations of 1215 may be performed by a beam measurement report manager as described with reference to FIGS. 5 through 9.

It should be noted that the methods described herein describe possible implementations, and that the operations and the steps may be rearranged or otherwise modified and that other implementations are possible. Further, aspects from two or more of the methods may be combined.

Aspects of the following examples may be combined with any of the previous examples or aspects described herein. Thus, example 1 is a method for wireless communication at a first wireless device that includes: receiving a first beam measurement report from a second wireless device, the first beam measurement report indicating a first set of beam measurements for a wireless channel between the first wireless device and the second wireless device, transmitting to the second wireless device a cluster validity metric for at least one beam in the first beam measurement report, receiving from the second wireless device, in response to transmitting the cluster validity metric, a second beam measurement report indicating a second set of beam measurements for the wireless channel, and selecting a beam for transmitting to the second wireless device based at least in part on the first and second beam measurement reports.

In example 2, the method of example 1 may include, wherein selecting the beam comprises: identifying, based at least in part on the first and second set of beam measurements, one or more distinct clusters associated with the wireless channel, wherein the beam is selected based at least in part on the identified one or more distinct clusters. In example 3, the method of examples 1 and 2 may include transmitting to the second wireless device an indication of the identified one or more distinct clusters to the second wireless device.

In example 4, the method of examples 1-3 may include determining, based at least in part on the first set of beam measurements, that a spatial separation between a first beam corresponding to a first distinct cluster and a second candidate beam fails to satisfy a separation threshold at the first wireless device, wherein the cluster validity metric for the second candidate beam is transmitted to the second wireless device based at least in part on the spatial separation failing to satisfy the separation threshold. In example 5, the method of examples 1-4 may include, wherein transmitting the cluster validity metric for the second candidate beam further comprises: transmitting to the second wireless device an indication of a minimum spatial separation between beams for the second set of beam measurements indicated in the second beam measurement report.

In example 6, the method of examples 1-5 may include, wherein transmitting the cluster validity metric for the second candidate beam comprises: transmitting to the second wireless device an indication that the second beam fails to satisfy the separation threshold with respect to the first beam corresponding to the first distinct cluster. In example 7, the method of examples 1-6 may include, wherein transmitting the cluster validity metric for the second candidate beam comprises: transmitting to the second wireless device an indication of an increased beam count for the second beam measurement report.

In example 8, the method of examples 1-7 may include, wherein transmitting the cluster validity metric for the second candidate beam comprises: transmitting to the second wireless device an indication of a codebook configuration used by the first wireless device. In example 9, the method of examples 1-8 may include transmitting to the second wireless device an indication of the selected beam.

In example 10, the method of examples 1-9 may include the first beam measurement report indicates, for at least one beam associated with the first set of beam measurements, a transmit beam index and a received power level for the transmit beam and a corresponding receive beam. In example 11, the method of examples 1-10 may include the cluster validity metric is based on at least one of: an antenna configuration, a codebook configuration, a cluster identification tolerance metric, a channel statistic, or a beam width for the first set of beam measurements.

Example 12 is a method for wireless communication at a second wireless device that includes: transmitting a first beam measurement report to a first wireless device, the first beam measurement report indicating a first set of beam measurements for a wireless channel between the first wireless device and the second wireless device, receiving from the first wireless device a cluster validity metric for at least one beam in the first beam measurement report, and transmitting to the first wireless device a second beam measurement report based at least in part on the cluster validity metric, the second beam measurement report indicating a second set of beam measurements for the wireless channel.

In example 13, the method of example 12 may include identifying, based at least in part on the first set of beam measurements or the second set of beam measurements, one or more distinct clusters associated with the wireless channel. In example 14, the method of examples 12 and 13 may include receiving an indication of an identified one or more distinct clusters from the first wireless device. In example 15, the method of examples 12-14 may include determining, based at least in part on the cluster validity metric, that a spatial separation between a first beam corresponding to a first distinct cluster and a second candidate beam fail to satisfy a separation threshold, wherein the second set of beam measurements are based at least in part on the spatial separation failing to satisfy the separation threshold.

In example 16, the method of examples 12-15 may include receiving an indication of a minimum spatial separation between beams for the second set of beam measurements. In example 17, the method of examples 12-16 may include receiving an indication that the second candidate beam fails to satisfy the separation threshold.

In example 18, the method of examples 12-17 may include receiving, based at least in part on the cluster validity metric, an indication of an increased beam count for the second beam measurement report. In example 19, the method of examples 12-18 may include receiving an indication of a codebook configuration used by the first wireless device. In example 20, the method of examples 12-19 may include receiving an indication of a selected beam from the first wireless device.

In example 21, the method of examples 12-20 may include the first beam measurement report indicates, for at least one beam associated with the first set of beam measurements, a transmit beam index and a received power level for the transmit beam and a corresponding receive beam. In example 22, the method of examples 12-21 may include the cluster validity metric is based on at least one of: an antenna configuration, a codebook configuration, a cluster identification tolerance metric, a channel statistic, or a beam width for the first set of beam measurements.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, universal terrestrial radio access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless device, comprising:

receiving a first beam measurement report from a second wireless device, the first beam measurement report indicating a first set of beam measurements for one or more beams included in a first set of clusters in a wireless channel between the first wireless device and the second wireless device;

transmitting to the second wireless device a cluster validity metric for at least one beam in the first beam measurement report;

receiving from the second wireless device, in response to transmitting the cluster validity metric, a second beam measurement report indicating a second set of beam measurements for one or more beams included in a second set of clusters spatially distinct from the one or more beams included in the first set of clusters in the wireless channel; and selecting a beam for transmitting to the second wireless device based at least in part on the first and the second beam measurement reports.

2. The method of claim 1, wherein selecting the beam comprises:
identifying, based at least in part on the first and second set of beam measurements, one or more distinct clusters associated with the wireless channel, wherein the beam is selected based at least in part on the identified one or more distinct clusters.

3. The method of claim 2, further comprising:
transmitting to the second wireless device an indication of the identified one or more distinct clusters to the second wireless device.

4. The method of claim 1, further comprising:
determining, based at least in part on the first set of beam measurements, that a spatial separation between a first beam corresponding to a first distinct cluster and a second candidate beam fails to satisfy a separation threshold at the first wireless device, wherein the cluster validity metric for the second candidate beam is transmitted to the second wireless device based at least in part on the spatial separation failing to satisfy the separation threshold.

5. The method of claim 4, wherein transmitting the cluster validity metric for the second candidate beam further comprises:
transmitting to the second wireless device an indication of a minimum spatial separation between beams for the second set of beam measurements indicated in the second beam measurement report.

6. The method of claim 4, wherein transmitting the cluster validity metric for the second candidate beam comprises:
transmitting to the second wireless device an indication that the second candidate beam fails to satisfy the separation threshold with respect to the first beam corresponding to the first distinct cluster.

7. The method of claim 4, wherein transmitting the cluster validity metric for the second candidate beam comprises:
transmitting to the second wireless device an indication of an increased beam count for the second beam measurement report.

8. The method of claim 4, wherein transmitting the cluster validity metric for the second candidate beam comprises:
transmitting to the second wireless device an indication of a codebook configuration used by the first wireless device.

9. The method of claim 1, further comprising:
transmitting to the second wireless device an indication of the selected beam.

10. The method of claim 1, wherein the first beam measurement report indicates, for the at least one beam in the first set of beam measurements, a transmit beam index and a received power level for the transmit beam index and a corresponding receive beam index.

11. The method of claim 1, wherein the cluster validity metric is based on at least one of: an antenna configuration, a codebook configuration, a cluster identification tolerance metric, a channel statistic, or a beam width for the first set of beam measurements.

12. A method for wireless communication at a second wireless device, comprising:
transmitting a first beam measurement report to a first wireless device, the first beam measurement report indicating a first set of beam measurements for one or more beams included in a first set of clusters in a wireless channel between the first wireless device and the second wireless device;
receiving from the first wireless device a cluster validity metric for at least one beam in the first beam measurement report; and
transmitting to the first wireless device a second beam measurement report based at least in part on the cluster validity metric, the second beam measurement report indicating a second set of beam measurements for one or more beams included in a second set of clusters spatially distinct from the one or more beams included in the first set of clusters in the wireless channel.

13. The method of claim 12, further comprising:
identifying, based at least in part on the first set of beam measurements or the second set of beam measurements, one or more distinct clusters associated with the wireless channel.

14. The method of claim 12, further comprising:
receiving an indication of an identified one or more distinct clusters from the first wireless device.

15. The method of claim 12, further comprising:
determining, based at least in part on the cluster validity metric, that a spatial separation between a first beam corresponding to a first distinct cluster and a second candidate beam fail to satisfy a separation threshold, wherein the second set of beam measurements are based at least in part on the spatial separation failing to satisfy the separation threshold.

16. The method of claim 15, further comprising:
receiving an indication of a minimum spatial separation between beams for the second set of beam measurements.

17. The method of claim 15, further comprising:
receiving an indication that the second candidate beam fails to satisfy the separation threshold.

18. The method of claim 15, further comprising:
receiving, based at least in part on the cluster validity metric, an indication of an increased beam count for the second beam measurement report.

19. The method of claim 15, further comprising:
receiving an indication of a codebook configuration used by the first wireless device.

20. The method of claim 12, further comprising:
receiving an indication of a selected beam from the first wireless device.

21. The method of claim 12, wherein the first beam measurement report indicates, for the at least one beam in the first set of beam measurements, a transmit beam index and a received power level for the transmit beam index and a corresponding receive beam index.

22. The method of claim 12, wherein the cluster validity metric is based on at least one of: an antenna configuration, a codebook configuration, a cluster identification tolerance metric, a channel statistic, or a beam width for the first set of beam measurements.

23. An apparatus for wireless communication at a first wireless device, comprising: a processor, memory in electronic communication with the processor; and instructions stored in the memory and executable by the processor to cause the apparatus to:
receive a first beam measurement report from a second wireless device, the first beam measurement report indicating a first set of beam measurements for one or more beams included in a first set of clusters in a wireless channel between the first wireless device and the second wireless device;

transmit to the second wireless device a cluster validity metric for at least one beam in the first beam measurement report;

receive from the second wireless device, in response to transmitting the cluster validity metric, a second beam measurement report indicating a second set of beam measurements for one or more beams included in a second set of clusters spatially distinct from the one or more beams included in the first set of clusters in the wireless channel; and select a beam for transmitting to the second wireless device based at least in part on the first and the second beam measurement reports.

24. The apparatus of claim 23, wherein the instructions to select the beam are executable by the processor to cause the apparatus to:

identify, based at least in part on the first and second set of beam measurements, one or more distinct clusters associated with the wireless channel, wherein the beam is selected based at least in part on the identified one or more distinct clusters.

25. The apparatus of claim 24, wherein the instructions are further executable by the processor to cause the apparatus to:

transmit to the second wireless device an indication of the identified one or more distinct clusters to the second wireless device.

26. The apparatus of claim 23, wherein the instructions are further executable by the processor to cause the apparatus to:

determine, based at least in part on the first set of beam measurements, that a spatial separation between a first beam corresponding to a first distinct cluster and a second candidate beam fails to satisfy a separation threshold at the first wireless device, wherein the cluster validity metric for the second candidate beam is transmitted to the second wireless device based at least in part on the spatial separation failing to satisfy the separation threshold.

27. The apparatus of claim 26, wherein the instructions to transmit the cluster validity metric for the second candidate beam further are executable by the processor to cause the apparatus to:

transmit to the second wireless device an indication of a minimum spatial separation between beams for the second set of beam measurements indicated in the second beam measurement report.

28. The apparatus of claim 26, wherein the instructions to transmit the cluster validity metric for the second candidate beam are executable by the processor to cause the apparatus to:

transmit to the second wireless device an indication that the second candidate beam fails to satisfy the separation threshold with respect to the first beam corresponding to the first distinct cluster.

29. The apparatus of claim 26, wherein the instructions to transmit the cluster validity metric for the second candidate beam are executable by the processor to cause the apparatus to:

transmit to the second wireless device an indication of an increased beam count for the second beam measurement report.

30. An apparatus for wireless communication at a second wireless device, comprising: a processor, memory in electronic communication with the processor; and instructions stored in the memory and executable by the processor to cause the apparatus to:

transmit a first beam measurement report to a first wireless device, the first beam measurement report indicating a first set of beam measurements for one or more beams included in a first set of clusters in a wireless channel between the first wireless device and the second wireless device;

receive from the first wireless device a cluster validity metric for at least one beam in the first beam measurement report; and transmit to the first wireless device a second beam measurement report based at least in part on the cluster validity metric, the second beam measurement report indicating a second set of beam measurements for one or more beams included in a second set of clusters spatially distinct from the one or more beams included in the first set of clusters in the wireless channel.

* * * * *